United States Patent
Nam et al.

(10) Patent No.: US 10,929,953 B2
(45) Date of Patent: Feb. 23, 2021

(54) METHOD AND APPARATUS FOR SELECTING COMMUNICATION INTERFACE IN WIRELESS COMMUNICATION SYSTEM

(71) Applicant: Samsung Electronics Co., Ltd., Gyeonggi-do (KR)

(72) Inventors: Yongwoo Nam, Gyeonggi-do (KR); Sinseok Seo, Montigny-le-Bretonneux (FR); Sooyoung Jang, Gyeonggi-do (KR); Youngsuk Sun, Gyeonggi-do (KR); Okseon Lee, Gyeonggi-do (KR); Youngki Hong, Seoul (KR); Hakyung Jung, Gyeonggi-do (KR); Jinhyoung Kim, Gyeonggi-do (KR); Jiangwei Xu, Gyeonggi-do (KR); Bongjhin Shin, Gyeonggi-do (KR); Gunuk Lee, Seoul (KR); Sanggon Lee, Gyeonggi-do (KR); Hyunjoo Lee, Seoul (KR); Hyeonhun Jung, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/551,088

(22) Filed: Aug. 26, 2019

(65) Prior Publication Data
US 2019/0378244 A1  Dec. 12, 2019

Related U.S. Application Data

(63) Continuation of application No. 15/875,714, filed on Jan. 19, 2018, now Pat. No. 10,395,342.

(30) Foreign Application Priority Data

Jan. 20, 2017  (KR) ........................ 10-2017-0009839

(51) Int. Cl.
*G06T 3/60* (2006.01)
*G09G 3/00* (2006.01)
(Continued)

(52) U.S. Cl.
CPC ................ *G06T 3/60* (2013.01); *G06F 3/147* (2013.01); *G09G 3/003* (2013.01); *H04B 1/385* (2013.01);
(Continued)

(58) Field of Classification Search
None
See application file for complete search history.

(56) References Cited

U.S. PATENT DOCUMENTS 7,848,756 B2  12/2010  Nader et al.
8,400,914 B2   3/2013  Sachs et al.
(Continued)

FOREIGN PATENT DOCUMENTS

KR  10-2015-0019443  2/2015

*Primary Examiner* — Michelle Chin
(74) *Attorney, Agent, or Firm* — The Farrell Law Firm, P.C.

(57) ABSTRACT

A method of a virtual reality (VR)-related device is provided, which includes setting a reference direction; receiving data; determining whether a direction of the data and the reference direction are different; modifying the direction of the data if the direction of the data and the reference direction are different; and transmitting data having the modified direction.

16 Claims, 28 Drawing Sheets

(a) Image of 360° in reference direction (b) When photographing direction is rotated θ

(d) Apply filter - Δθ

(c) Image of 360° according to rotation

(51) Int. Cl.
  *G06F 3/147* (2006.01)
  *H04W 4/02* (2018.01)
  *H04L 29/06* (2006.01)
  *H04B 1/3827* (2015.01)
  *H04W 28/02* (2009.01)

(52) U.S. Cl.
  CPC ............ *H04L 67/38* (2013.01); *H04W 4/026* (2013.01); *G09G 2320/106* (2013.01); *G09G 2330/08* (2013.01); *G09G 2340/0464* (2013.01); *G09G 2370/022* (2013.01); *G09G 2370/10* (2013.01); *G09G 2370/16* (2013.01); *H04B 2001/3866* (2013.01); *H04L 69/163* (2013.01); *H04W 28/0242* (2013.01)

(56) References Cited

U.S. PATENT DOCUMENTS

| | | |
|---|---|---|
| 8,811,201 B2 | 8/2014 | Sachs et al. |
| 9,398,525 B2 | 7/2016 | Frantz et al. |
| 2002/0039891 A1 | 4/2002 | Loke et al. |
| 2005/0239497 A1 | 10/2005 | Bahl et al. |
| 2010/0014470 A1* | 1/2010 | Prytz .................. H04L 12/5692 370/329 |
| 2011/0110300 A1* | 5/2011 | Sachs .................... H04W 48/04 370/328 |
| 2011/0142008 A1* | 6/2011 | Choi .................... H04W 36/04 370/332 |
| 2014/0269495 A1 | 9/2014 | Frantz et al. |
| 2015/0085171 A1 | 3/2015 | Kim |
| 2015/0358757 A1 | 12/2015 | Ford et al. |
| 2018/0049108 A1* | 2/2018 | Yang ....................... H04W 4/70 |

\* cited by examiner

FIG. 3

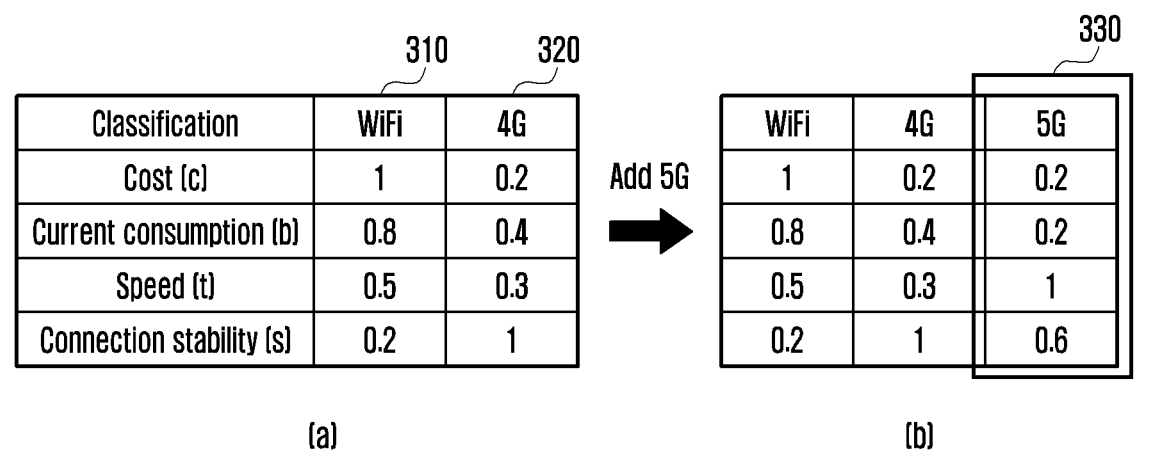

| Classification | WiFi | 4G |
|---|---|---|
| Cost (c) | 1 | 0.2 |
| Current consumption (b) | 0.8 | 0.4 |
| Speed (t) | 0.5 | 0.3 |
| Connection stability (s) | 0.2 | 1 |

(a)

Add 5G →

| | WiFi | 4G | 5G |
|---|---|---|---|
| | 1 | 0.2 | 0.2 |
| | 0.8 | 0.4 | 0.2 |
| | 0.5 | 0.3 | 1 |
| | 0.2 | 1 | 0.6 |

| Operation | Weight information | | | | RAT selection-related information | | |
|---|---|---|---|---|---|---|---|
| | c | b | t | s | WiFi | 4G | 5G |
| Basic | 0.7 | 0.1 | 0.1 | 0.1 | 0.85 | 0.31 | 0.32 |
| Subscription information | 0.7 | 0.1 | 0.1 | 0.1 | 0.85 | 0.87 | 0.88 |
| UE state | 0.6 | 0.0 | 0.0 | 0.4 | 0.66 | 1 | 0.84 |
| Traffic characteristics | 0.5 | 0.0 | 0.2 | 0.3 | 0.66 | 0.86 | 0.88 |

METHOD AND APPARATUS FOR SELECTING COMMUNICATION INTERFACE IN WIRELESS COMMUNICATION SYSTEM

PRIORITY

This application claims priority under 35 U.S.C. § 119(a) to Korean Patent Application Serial No. 10-2017-0009839, which was filed in the Korean Intellectual Property Office on Jan. 20, 2017, and U.S. patent application Ser. No. 15/875,714, which was filed in the United States Patent and Trademark Office on Jan. 19, 2018 and is scheduled to issue on Aug. 27, 2019, the entire contents of which are incorporated herein by reference.

BACKGROUND

1. Field of the Disclosure

The present disclosure relates generally to a wireless communication system and, more particularly, to a method for a terminal to select a communication interface based on dynamically changed information.

Furthermore, the present disclosure relates to a method of recovering a lost packet without a reduction of throughput depending on the reason of a lost packet if the transmission control protocol (TCP) packet is lost.

Furthermore, the present disclosure relates to a method for providing virtual reality (VR) content in the same direction to a user regardless of a photographing direction if VR-related content is generated.

2. Description of Related Art

To meet the demand for wireless data traffic having increased since the deployment of 4G communication systems, efforts have been made to develop an improved 5G or pre-5G communication system. Therefore, the 5G or pre-5G communication system is also called a "beyond 4G network" or a "post LTE system".

The 5G communication system is considered to be implemented in higher frequency (e.g., mmWave) bands, e.g., 60 GHz bands, so as to accomplish higher data rates. To decrease propagation loss of the radio waves and increase the transmission distance, beamforming, massive multiple-input multiple-output (mMIMO), full dimensional MIMO (FD-MIMO), array antenna, analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMPs), reception-end interference cancellation, etc.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as advanced access technologies have been developed.

If communication is performed through the 5G communication system, the communication speed is increased compared to the 4G communication system, but current consumption and costs may be increased. Accordingly, a user equipment (UE) requires a method of selecting an optimal communication interface (or radio access network (RAT)) according to circumstances by taking into consideration a user's preference, the state of the UE and/or the type of service used by the UE. In this case, parameters, such as a user's preference, the state of a UE and/or the type of service used by a UE, are dynamically changed. In a conventional technology, a method of selecting a RAT by taking into consideration such UE information is not present.

Accordingly, there is a need for a method of selecting the best RAT by taking into consideration a dynamically changed parameter.

Furthermore, if some TCP packets transmitting through the TCP protocol are lost, a UE may transmit selective acknowledgement (SACK), and a server may decrease a congestion window (CWND).

In this case, if the packets have not been lost due to congestion, it is not necessary to decrease the CWND, and there is a problem that throughput is unnecessarily decreased. Accordingly, there is a need for a method of recovering a lost packet without a reduction of throughput based on the reason of a lost packet.

Furthermore, if the photographing direction of a photographing device is changed when VR content is generated, there may be a problem in that a screen provided through a VR UE is rotated. Accordingly, there is a need for a method for providing VR content in the same direction regardless of the photographing direction.

SUMMARY

Accordingly, an aspect of the present disclosure provides a method and apparatus for determining the best RAT by taking into consideration a dynamically changed parameter.

Another aspect of the present disclosure provides a method and apparatus for recovering a lost packet without a reduction of throughput depending on the reason of a lost packet.

Another aspect of the present disclosure provides a method and apparatus for providing VR content in the same direction regardless of a photographing direction.

According to an aspect of the present disclosure, a method of a UE includes identifying weight information according to preference information when a radio access network (RAT) selection event is triggered, modifying the weight information based on UE information of the UE, and selecting an RAT based on the modified weight information.

According to an aspect of the present disclosure, a UE includes a transceiver configured to transmit or receive a signal and a controller configured to identify weight information according to preference information when a radio access network (RAT) selection event is triggered, modify the weight information based on UE information of the UE, and select an RAT based on the modified weight information.

According to an aspect of the present disclosure, a method of a UE includes identifying a reason of a packet loss when the packet loss is generated, transmitting positive ACK to a server if the reason of the packet loss is not congestion, requesting transmission of the lost packet from the server through a hypertext transfer protocol (HTTP) layer, and receiving the lost packet from the server.

According to an aspect of the present disclosure, a UE includes a transceiver configured to transmit or receive a signal and a controller configured to identify a reason of a packet loss when the packet loss is generated, transmit positive ACK to a server if the reason of the packet loss is not congestion, request transmission of the lost packet from the server through a hypertext transfer protocol (HTTP) layer, and receive the lost packet from the server.

According to an aspect of the present disclosure, a method of a VR-related device includes setting a reference direction, receiving data, determining whether a direction of the data and a reference direction are different, modifying the direction of the data if the direction of the data and the reference direction are different, and transmitting data having the modified direction.

According to an aspect of the present disclosure, a VR-related device includes a transceiver configured to transmit or receive a signal and a controller configured to set a reference direction, receive data, determine whether a direction of the data and a reference direction are different, modify the direction of the data if the direction of the data and the reference direction are different, and transmit data having the modified direction.

According to an aspect of the present disclosure, a method of a UE includes receiving data, identifying a direction of the data, determining whether the direction of the data and a reference direction are different, and adjusting a direction detection sensor of the UE if the direction of the data and the reference direction are different.

According to an aspect of the present disclosure, a UE includes a transceiver configured to transmit or receive a signal and a controller configured to receive data, identify a direction of the data, determine whether the direction of the data and a reference direction are different, and adjust a direction detection sensor of the UE if the direction of the data and the reference direction are different.

BRIEF DESCRIPTION OF THE DRAWINGS

The above and other aspects, features, and advantages of the present disclosure will be more apparent from the following detailed description taken in conjunction with the accompanying drawings, in which:

FIG. 3 is a diagram illustrating how quality information is determined, according to an embodiment of the present disclosure;

FIG. 5 is a diagram illustrating how RAT selection-related information is determined, according to an embodiment of the present disclosure.

DETAILED DESCRIPTION

Figure 1:
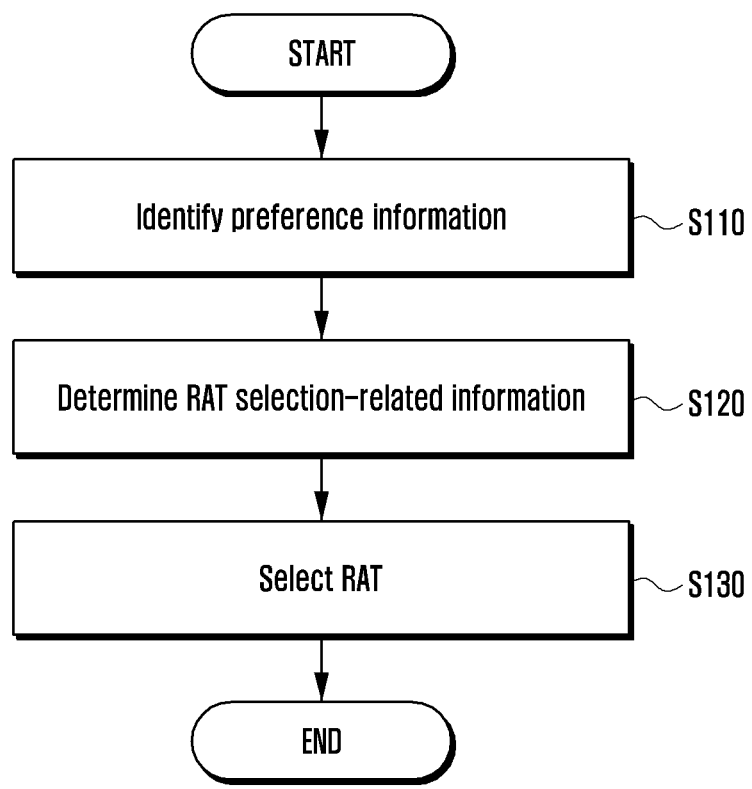
FIG. 1 is a flowchart illustrating a method for a UE to determine a RAT, according to an embodiment of the present disclosure.

In the present disclosure, in describing the embodiments, a description of contents that are well known in the art to which the present disclosure pertains and not directly related to the present disclosure is omitted in order to make the present disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

The present disclosure is not limited to the disclosed embodiments, but may be implemented in various different ways. The embodiments are provided to complete the present disclosure and to allow those skilled in the art to understand the present disclosure.

In the present disclosure, it is understood that each block of the flowchart illustrations and combinations of the blocks in the flowchart illustrations can be executed by computer program instructions. These computer program instructions may be executed on the processor of a general purpose computer, a special purpose computer, or other programmable data processing apparatus, so that the instructions executed by the processor of the computer or other programmable data processing apparatus create a way for executing the functions specified in the flowchart block or blocks. These computer program instructions may also be stored in computer-usable or computer-readable memory that can direct a computer or other programmable data processing equipment to function in a particular manner, such that the instructions stored in the computer-usable or computer-readable memory produce an article of manufacture including instruction ways that implement the function specified in the flowchart block or blocks. The computer program instructions may also be loaded into a computer or other programmable data processing apparatus to create a series of operational steps to be performed on the computer or other programmable apparatus to produce a computer-executed process, so that the instructions performing the computer or other programmable apparatus provide steps for executing the functions described in the flowchart block or blocks.

Furthermore, each block of the flowchart illustrations may represent a portion of a module, a segment, or code, which includes one or more executable instructions for implementing specific logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit", as used herein, means, but is not limited to, a software or hardware component, such as a field programmable gate array (FPGA) or an application specific integrated circuit (ASIC), which performs specific tasks. The "unit" may be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units", or may be further separated into additional components and "units." Furthermore, the components and "units" may be implemented to operation on one or more central processing units (CPUs) within a device or a security multimedia card.

A plurality of communication interfaces (or RATs) may be mounted on a UE. The UE may select any one of the plurality of RATs and perform communication. For example, in the long-term evolution (LTE) system, a UE may perform communication using any one of WiFi, a 3G network, and a 4G network. The LTE UE may perform communication through the 4G network. If a user selects WiFi, the LTE UE may first select WiFi and may perform communication. If the network state is unstable, the UE may perform communication over the 3G network. In the conventional system, a UE may select a default RAT or may select a RAT in response to a user selection.

If communication is performed through the 5G communication system, the communication speed is increased compared to the 4G communication system, but current consumption and costs may be increased. Accordingly, there is a need for a method for a UE to select the best RAT according to the circumstances by taking into consideration a user's preference, the state of the UE and/or the type of service used by the UE. The reason for this is that priorities of a communication speed increase or current consumption and cost increases may be changed depending on a user's preference or the state of the UE and the degree of current consumption and costs may be changed depending on the state of the UE or the type of service.

In this case, parameters, such as a user's preference, the state of a UE, and the type of service used by the UE, may dynamically change. The conventional technology does not include a method for selecting a RAT by taking into consideration such UE information.

An embodiment of the present disclosure provides a method for determining the best RAT by taking into consideration a dynamically changed parameter.

FIG. 1 is a flowchart illustrating a method for a UE to determine a RAT, according to an embodiment of the present disclosure.

Referring to FIG. 1, at step S110, the UE may identify preference information.

A user may select at least one of the preference parameters included in the UE. The preference parameters may include a cost, current consumption, speed, and connection stability. The preference parameters are not limited to the aforementioned examples and some parameters may be added or the parameters may be deleted depending on user's configuration. Furthermore, the preference parameter may be interchangeably used with a preference item.

The user may select a preference parameter upon performing the initial configuration. Alternatively, the user may input preference information or change a preference parameter using the configuration function of the UE when the user desires. The preference parameter selected by the user as described above may be referred to as preference information.

The UE may identify the preference information according to the user's input. The preference information may have been previously received or configured. The UE may identify the previously received or configured preference information. Alternatively, the UE may receive preference information and identify the received preference information.

When a RAT selection event is generated, the UE may identify previously received or configured preference information. Alternatively, when a RAT selection event is generated, the UE may receive preference information.

The preference information may include two or more preference parameters, and may include priority of the preference parameters. In this case, the scope of the present disclosure is not limited thereto, and the preference information may be configured in various forms.

The UE may determine weight information for each preference parameter based on the preference information. Alternatively, the weight information for the preference parameter may have been previously determined. The UE may identify the weight information for the preference parameter.

The UE may set weights to be different values for the preference parameters based on the preference information, and may set a high weight for a preference parameter selected by a user.

When the user selects the cost, the UE may set the highest weight for the cost. Weight may be set, for example, to cost=0.7, current consumption=0.1, speed=0.1, and connection stability=0.1. That is, the UE may determine weight to be a previously set basic value with respect to a preference parameter not selected by the user, and may determine a high weight with respect to a preference parameter selected by the user. According to an embodiment of the present disclosure, the weight determined based on preference information only may be called basic weight.

For example, weight information for the preference parameters may be determined as in Table 1.

TABLE 1

| Classification | 1st priority | 2nd priority | Cost | Current consumption | Speed | Connection stability |
|---|---|---|---|---|---|---|
| 1 item selection | Cost priority | | 1 | 0 | 0 | 0 |
| | Balance | | 0.25 | 0.25 | 0.25 | 0.25 |
| | Cost | — | 0.7 | 0.1 | 0.1 | 0.1 |
| | Current consumption | — | 0.1 | 0.7 | 0.1 | 0.1 |
| | Speed | — | 0.1 | 0.1 | 0.7 | 0.1 |
| | Connection stability | — | 0.1 | 0.1 | 0.1 | 0.7 |
| 1 item selection | Cost | Current consumption | 0.5 | 0.3 | 0.1 | 0.1 |
| | Cost | Speed | 0.5 | 0.1 | 0.3 | 0.1 |
| | Cost | Connection stability | 0.5 | 0.1 | 0.1 | 0.3 |
| | Current consumption | Cost | 0.3 | 0.5 | 0.1 | 0.1 |
| | Current consumption | Speed | 0.1 | 0.5 | 0.3 | 0.1 |
| | Current consumption | Connection stability | 0.1 | 0.5 | 0.1 | 0.3 |
| | Speed | Cost | 0.3 | 0.1 | 0.5 | 0.1 |
| | Speed | Current consumption | 0.1 | 0.3 | 0.5 | 0.1 |
| | Speed | Connection stability | 0.1 | 0.1 | 0.5 | 0.3 |
| | Connection stability | Cost | 0.3 | 0.1 | 0.1 | 0.5 |
| | Connection stability | Current consumption | 0.1 | 0.3 | 0.1 | 0.5 |
| | Connection stability | Speed | 0.1 | 0.1 | 0.3 | 0.5 |

The aforementioned descriptions are merely an embodiment of a method of setting weight information. The UE may set the weight information in various ways depending on an actual implementation and a preference parameter selected by a user.

As described above, the UE may previously receive preference information. Accordingly, preference information and weight may have been previously configured.

At step S120, the UE may determine RAT selection-related information.

The UE may determine the RAT selection-related information based on UE information. In this case, the UE information may include at least one of pieces of information that affect communication quality and are dynamically changed, such as subscription information (e.g., data plan or rate system information) of the UE, the state information of the UE, and traffic characteristic information. In this case, the UE information according to an embodiment of the present disclosure is not limited thereto, and may include various parameters that are dynamically changed, such as network state information.

The UE may modify the weight of a preference parameter based on UE information. The reason for this is to take into consideration dynamically changed characteristics.

Furthermore, the UE may modify quality information based on UE information in order to take into consideration dynamically changed characteristics. The quality information may be determined with respect to each preference parameter for each RAT. Quality information for a preference parameter may be configured in a table form for each RAT. This is merely an embodiment of the present disclosure, and quality information may have been configured in various forms.

When a specific event (e.g., the addition or deletion of an available RAT) is generated, the UE may modify quality information. In this case, only one of a process for modifying weight and a process for modifying quality information may be performed or omitted.

Thereafter, the UE may determine RAT selection-related information using the weight information and the quality information. Specifically, the UE may determine the RAT selection-related information by multiplying the weight information and the quality information for each preference parameter and adding the multiplied values for each RAT. The UE may select a RAT suitable for conditions by the RAT selection-related information by taking into consideration the UE information of the UE as described above.

At step S130, the UE may select a RAT.

The UE may select a RAT based on RAT selection-related information. Specifically, the UE may select a RAT having the greatest value of the RAT selection-related information.

Furthermore, the UE may use the existing traffic in order to select the RAT. That is, the UE may select the RAT by taking into consideration whether existing traffic is present.

If the existing traffic is present, the UE may identify whether the existing RAT and a selected RAT are the same. If the existing RAT and the selected RAT are different, the UE may select the RAT using quality of service (QoS) and current consumption weights.

Figure 2:
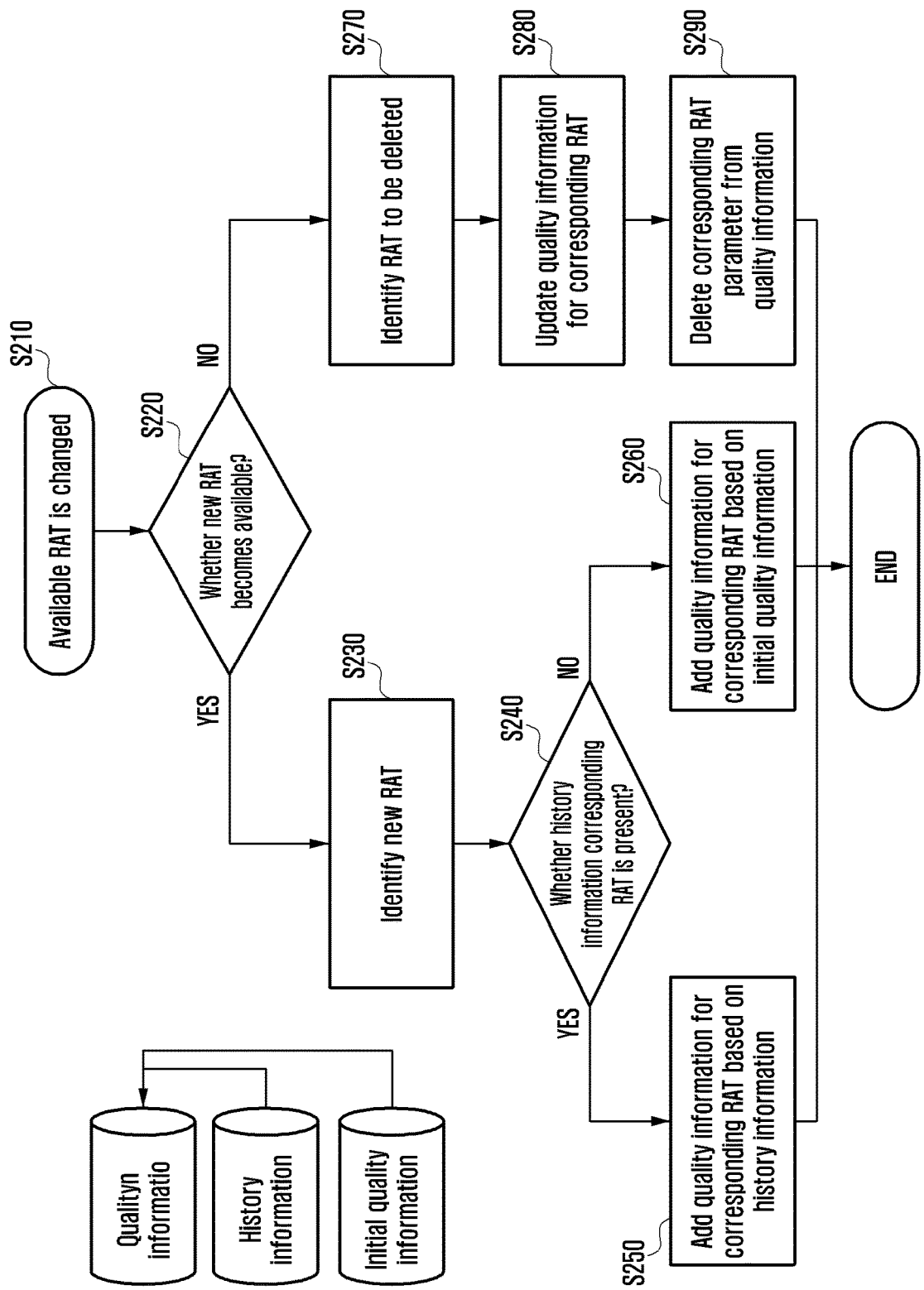
FIG. 2 is a flowchart illustrating a method for a UE to determine quality information, according to an embodiment of the present disclosure.

FIG. 2 is a flowchart illustrating a method for a UE to determine quality information, according to an embodiment of the present disclosure.

Quality information may be configured with respect to each preference parameter for each RAT so that the characteristics of each RAT can be incorporated. In this case, the quality information may have been stored in the UE. In an embodiment of the present disclosure, quality information first stored in the UE may be referred to as basic quality information. The basic quality information may be interchangeably used with initial quality information or default quality information.

If an available RAT of a plurality of RATs mounted on a UE is changed, the UE may modify quality information. If a new RAT becomes available, the UE may add quality information for the corresponding RAT. If an available RAT becomes unavailable, the UE may delete quality information for the corresponding RAT.

At step S210, a UE may detect that an available RAT has been changed. That is, if a new RAT becomes available (e.g., new RAT addition) or an available RAT becomes unavailable (e.g., RAT deletion), the UE may detect the new RAT or the deleted RAT.

Furthermore, the UE may identify the type of change of the RAT. That is, at step S220, the UE may identify whether the new RAT becomes available.

If, as a result of identifying, the new RAT becomes available, at step S230, the UE may identify the new RAT. At step S240, the UE may identify whether history information for quality information for the corresponding RAT is present. In this case, the history information may mean quality information that has been modified and stored in addition to initial quality information. The quality information may be modified based on UE information. If quality information for a RAT has been modified, the UE may store the modified quality information. The quality information modified and stored as described above may be called a history. The history information may also be called quality information stored in addition to initial quality information. The history information may have been stored in a database (DB).

If the history information is present, at step S250, the UE may add quality information for the corresponding RAT based on the history information.

In this case, the UE may use the history information for some preference parameters only. In such a case, the UE may use the initial quality information for the remaining parameters.

Preference parameters, such as speed and connection stability, are dynamically changed values in using a RAT, and may be updated. Accordingly, a value for quality information recently stored in the history information may be used as the quality information that may be changed. In contrast, the cost may be determined by taking into consideration characteristics and a user rate system for each RAT. The current consumption may be determined based on a value measured for each RAT and may not be changed. The UE may use a value included in the initial quality information as the parameter that is not changed as described above.

The UE may determine the quality information using the initial quality information and the recently stored quality information, belonging to values stored in the DB, depending on a preference parameter. In this case, the UE may use the recently stored quality information or the initial quality information with respect to all the preference parameters.

If the initial quality information is used with respect to all the preference parameters, the UE may omit step S250.

In contrast, if history information is not present, the UE may add quality information for a corresponding RAT based on the initial quality information at step S260. That is, the UE may extract quality information of each preference parameter for a corresponding RAT from the initial quality information and add the extracted quality information. In the initial quality information of a corresponding RAT, the cost may be determined by taking into consideration characteristics and a user rating system for each RAT, and the current consumption may be determined based on a value measured for each RAT. The speed and connection stability may be determined based on characteristics for each RAT.

If a RAT is to be deleted, at step S270, the UE may identify the RAT to be deleted. At step S280, the UE may update quality information for the corresponding RAT. The UE may store quality information for the corresponding RAT in the DB or update the quality information stored in the DB.

In this case, the UE may store or update only dynamically changed quality information for the preference parameters of the RAT to be deleted, such as speed and connection stability. Accordingly, when a corresponding RAT is subsequently added as described above, the UE may modify quality information using stored quality information. In this case, step S280 may be omitted.

At step S290, the UE may modify quality information by deleting a corresponding RAT parameter from the quality information.

FIG. 3 is a diagram illustrating how quality information is determined, according to an embodiment of the present disclosure.

Referring to FIG. 3, the quality information may be configured for each RAT with respect to preference parameters. The quality information may be modified in response to a change of UE information or an available RAT. FIG. 3 illustrates a method for modifying quality information in response to a change of an available RAT.

Referring to FIG. 3(a), a currently available RAT may be a WiFi or a 4G network, and quality information for preference parameters may have been stored in a UE with respect to WiFi 310 and 4G 320. Alternatively, the UE may receive the information through an eNB.

The quality information for the preference parameters for each RAT may have been stored in the form of a quality information table. In this case, the present disclosure is not limited thereto, and the quality information may be stored in various forms.

The quality information may include the relative quality values for parameters, such as a cost, current consumption, speed, and connection stability. In this case, as described above, the quality information may further include quality information for a preference parameter into which the dynamic characteristics of the UE can be incorporated in addition to the preference parameters of FIG. 3(a) or quality information for some parameters may be deleted.

The quality information may be determined based on a relative ratio with another RAT with respect to the same preference parameter.

A method of determining quality information for each preference parameter is as follows. Quality information is used to generate RAT selection-related information in such a way as to be multiplied by weight and added with a value calculated with respect to another preference parameter.

In this case, a UE may select a RAT having a large amount of RAT selection-related information, and thus the quality information may be configured so that a preference parameter is suitable for selecting a RAT. For example, the UE may select a RAT having a low cost and current consumption. Quality information for the parameters may be set high in the RAT having a low cost and current consumption. In contrast, the UE may select a RAT having high speed and connection stability. Quality information for the parameters may be set high in the RAT having high speed and connection stability. In contrast, the UE may be configured to select a RAT having a small value of RAT selection-related information, and thus quality information may be reversely set.

For example, quality information for the cost parameter in WiFi may be set to 1, and quality information for the cost parameter in 4G may be set to 0.2. That is, since the cost for WiFi is unsatisfactory, quality information for the cost parameter may be set to 1. In contrast, in the case of 4G, quality information for the cost parameter may be set to 0.2 because a cost according to use is generated. That is, as the cost is reduced, quality information may be set high. In this case, a value of the quality information may be determined based on a cost generated in each RAT.

Quality information for the cost may be changed based on subscription information. A quality information value of the cost parameter may be increased or decreased based on the amount of data (e.g., in the case of an unlimited rate system, a cost parameter of 4G may also be set to 1). Furthermore, as a lower cost is generated, quality information for the cost parameter may be set high.

For example, quality information for the speed parameter of WiFi may be set to 0.5 and quality information for the speed parameter of LTE may be set to 0.3 depending on the ratio of speed of WiFi and speed of 4G.

In this case, actually measured speed may be changed depending on the connection conditions of a network or the conditions of a UE.

In order to take into consideration such a dynamic change, weight information may be changed. In this case, a method for modifying quality information instead of weight information may be used.

If a 5G communication system is added as an available RAT for a reason, such as a change in the position of a UE, the UE may modify quality information.

Referring to FIG. 3(b), quality information for a 5G communication system may be added to quality information. A UE may add quality information for 5G 330 to quality information using initial quality information or recently stored quality information.

In this case, the quality information of 5G may also be determined in the form of a relative ratio for another RAT.

Through such a method, a UE can maintain quality information into which the characteristics of a currently available RAT have been incorporated in real time.

A process for modifying quality information if a new RAT becomes available or an available RAT becomes unavailable may be previously determined before a UE selects a RAT. In this case, a process of adding a new RAT to quality information or deleting a RAT may be previously performed. This process may be omitted in a process for a UE to select a RAT.

Figure 4:
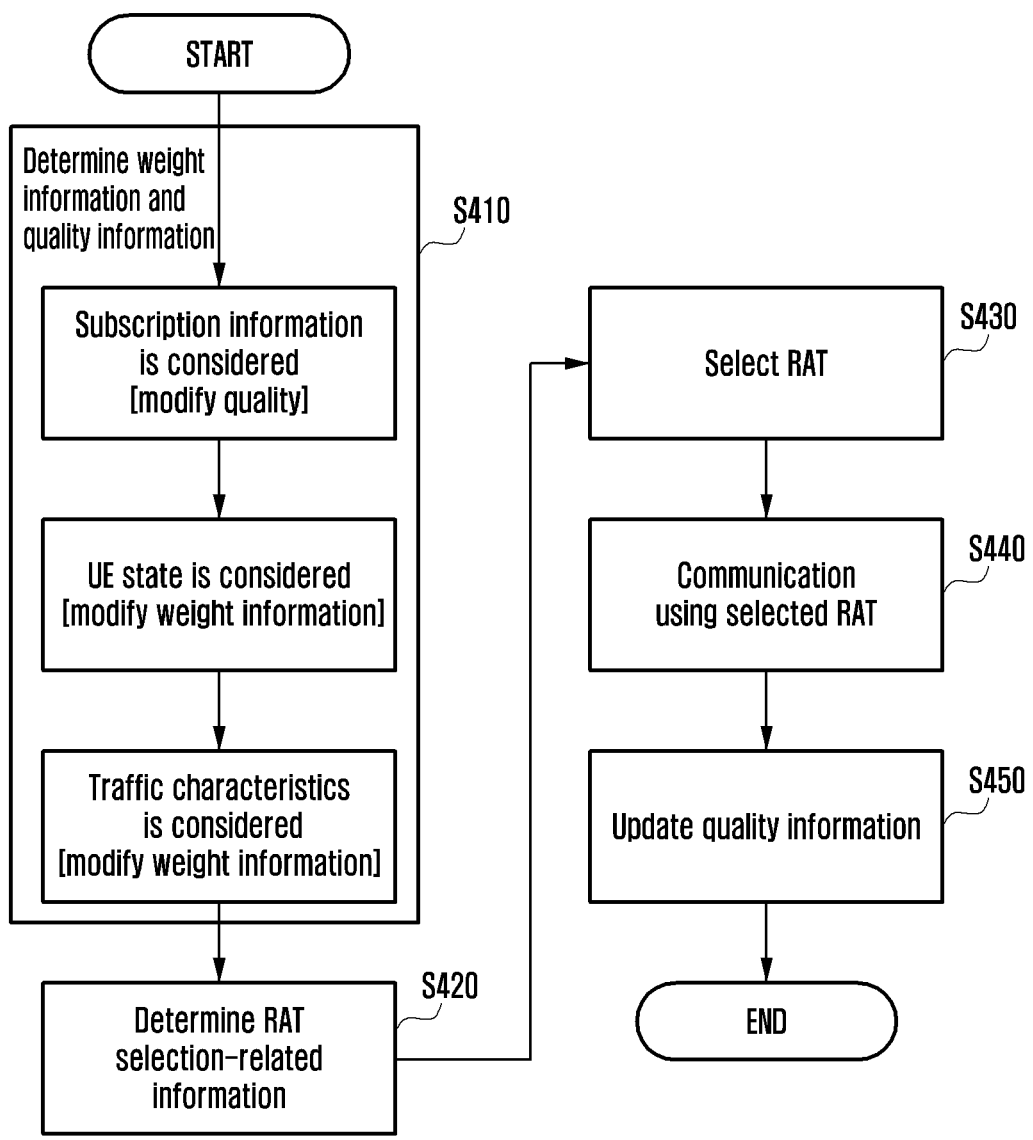
FIG. 4 is a flowchart illustrating a method for a UE to determine RAT selection-related information, according to an embodiment of the present disclosure.

FIG. 4 is a flowchart illustrating a method for a UE to determine RAT selection-related information, according to an embodiment of the present disclosure.

Weight and quality information for preference parameters may have been previously configured. A UE may identify the weight information and the quality information.

Alternatively, if user preference information is changed or an available RAT is changed after a RAT selection event is generated, the weight information and the quality information may be modified.

In this case, although weight and quality information for preference parameters have been previously set, subscription information, traffic characteristics, and the state of a UE may be dynamically changed. The UE may select a RAT by taking into consideration UE information. In this case, the subscription information may include a rate system or data plan used by a user, and may include UE information because the amount of data provided depending on the subscription information may be changed.

According to an embodiment of the present disclosure, UE information of a UE includes subscription information, traffic characteristics, and state information of a UE, but the contents of the present disclosure are not limited thereto.

A UE may dynamically modify weight information and quality information using UE information.

When a RAT selection event is generated, at step S410, a UE may determine weight information and quality information based on the UE information.

In this case, the RAT selection event may be triggered when a data communication request is generated or an available RAT is changed. The data communication request may include a data request for each application, for each flow for one application, or for each packet.

The UE may determine quality information by taking into consideration subscription information. That is, the UE may modify the quality information based on the amount of data available depending on the subscription information.

The UE may modify the quality information for a cost parameter based on the amount of remaining data. That is, the UE may set the quality information high for the cost parameter as the amount of remaining data becomes large, and may set the quality information low for the cost parameter as the amount of remaining data becomes small.

For example, if data can be used without a limit for a specific time, the UE may set the quality information for the cost parameter to 1 for the specific time.

If there is a difference in the speed based on the subscription information, the UE may modify the quality information depending on a difference in the speed. If provided data has been fully used, a cost is not generated, but the speed may be decreased. For example, if data has been fully used, 2 GB of data may be provided for a day. If the 2 GB of data is fully used, the speed may be decreased to 300 Kbps. In this case, the speed may be decreased, and the UE may modify the quality information for the speed parameter.

Alternatively, the UE may use a method of modifying weight information instead of quality information based on the subscription information.

The UE may determine the weight information based on state information. If the amount of remaining battery power of the UE is a threshold or more, current consumption weight may be decreased. That is, if the amount of remaining battery power of the UE is large, the UE may select a RAT based on other parameters (e.g., speed and cost) rather than current consumption. Accordingly, the UE may decrease the current consumption weight.

If charging is being performed, the UE may set the current consumption weight to 0. In contrast, if the UE operates in low energy mode, the UE may increase the current consumption weight.

If the UE is moving, connection stability may become the most important parameter. The UE may increase connection stability weight.

In this case, if weight information prior to modification is 0 or 1, the UE may not modify the weight information.

The UE may determine the weight information depending on traffic characteristics. That is, the UE may adjust the weight information depending on the type of traffic generated in an application.

In the case of downlink traffic, in order to maintain speed, but to select a RAT having a low cost, the UE may increase the weight for the speed and the cost. In the case of streaming service traffic, in order to select a RAT having a low cost and providing seamless service, the UE may increase the weight for the cost and connection stability.

Furthermore, in the case of web browser traffic, in order to use a seamless service, the UE may increase the weight for connection stability. In the case of traffic for a background service, the UE may increase the current consumption weight.

UE information, such as the subscription information, state information of the UE and traffic characteristics, may be changed in their order and applied. A specific operation may not be applied according to circumstances. A method for modifying quality information if subscription information characteristics are taken into consideration has been illustrated, but weight information may be modified. Likewise, a method for modifying quality information with respect to state information and traffic characteristics of a UE may be used.

At step S420, the UE may determine RAT selection-related information. The UE may determine the RAT selection-related information using the modified weight information and quality information by taking into consideration the UE information of the UE.

In order to determine the RAT selection-related information, Equation (1) may be used.

$$\alpha_c RAT_c + \alpha_b RAT_b + \alpha_t RAT_t + \alpha_s RAT_s = \sum_{i=1}^{n} \alpha_i RAT_i \quad (1)$$

In this case, $\alpha_i$ may mean weight information, and $RAT_i$ may mean quality information in a RAT.

FIG. 5 is a diagram illustrating how RAT selection-related information is determined, according to an embodiment of the present disclosure.

FIG. 5 illustrates an embodiment of the present disclosure in which RAT selection-related information is determined by taking into consideration UE characteristic information. Referring to FIG. 5, it is assumed that a user has selected the cost of preference parameters and quality information complies with the embodiment of FIG. 3.

Default weight information is weight information into which UE characteristic information has not been incorporated. For example, cost=0.7, current consumption=0.1, speed=0.1, and connection stability=0.1.

If UE information of a UE is not taken into consideration, the UE may determine RAT selection-related information as follows using the quality information illustrated in FIG. 3.

WiFi=0.7*1+0.1*0.8+0.1*0.5+0.1*0.2=0.85

4G=0.7*0.2+0.1*0.4+0.1*0.3+0.1*1=0.31

5G=0.7*0.2+0.1*0.2+0.1*1+0.1*0.6=0.32

Accordingly, since quality information of WiFi is the highest, the UE may select WiFi, may access WiFi, and may perform communication.

If the dynamic characteristics of the UE are taken into consideration, the UE may determine the RAT selection-related information using the modified weight information and quality information.

For example, it is assumed that a data fee is not generated on a specific time depending on subscription information of a user.

Accordingly, the UE may set quality information of a cost parameter to 1. As quality information of the cost parameter approaches 1, it means that a lower cost is generated. If a data communication request is generated during the time in which a data fee is not generated as described above, the dynamic characteristics of the UE may be incorporated by setting quality information of the cost parameter to 1.

If the RAT selection-related information is calculated based on the results of the modification of the quality information, a quality information value when a 5G communication system is used is the largest as illustrated in FIG. 5. Accordingly, the UE may select the 5G communication system.

In this case, the UE may modify weight information without modifying the quality information. The UE may increase weight for the cost parameter based on the subscription information.

The UE may modify the weight information by taking into consideration the UE state. If the UE is in the moving state, connection stability may become more important compared to other preference parameters. Accordingly, the UE may reduce weight for other parameters and increase weight for the connection stability parameter. FIG. 5 illustrates an example in which the weight for cost, current consumption, and speed has been decreased by 0.1 and weight for connection stability has been increased by 0.3.

If the RAT selection-related information is calculated based on the determined weight information, a 4G communication system has the greatest quality information value. Accordingly, the UE may select the 4G communication system.

The UE may modify the weight information by taking into consideration traffic characteristics. If a high-capacity file is to be downloaded, the UE may increase weight for the speed parameter because it is important to download the file at a fast speed. FIG. 5 illustrates an example in which weight for cost and connection stability has been decreased by 0.1 and weight for speed has been increased by 0.2. In this case, traffic characteristics have been further incorporated into the weight information into which the UE state has been incorporated.

If the RAT selection-related information is calculated based on the determined weight information, the UE may select the 5G communication system because the 5G communication system has the largest quality information value.

The weight information is merely an embodiment of the present disclosure, and the scope of the present disclosure is not limited thereto. All of the operations (e.g., data plan incorporation, UE state incorporation and traffic characteristic incorporation) into which the dynamic characteristics of the UE are incorporated may be performed, but some of the operations may be performed or any of the operations may not be performed if available information is not present.

Returning to FIG. 4, at step S430, the UE may select a RAT. The UE may select a RAT to be used for communication and select a RAT having the greatest RAT selection-related information.

If pieces of RAT selection-related information are the same, the UE may select a RAT according to a predetermined priority.

For example, the priority may have been determined in order of first WiFi, second 4G, and third 5G. If WiFi and 4G have the same quality information, the UE may select WiFi to perform communication.

When selecting a RAT, the UE may take existing traffic into consideration. The existing traffic may mean traffic generated before a RAT selection event. A RAT through which a UE performs the existing traffic may be called the existing RAT.

If the existing traffic is not present when a data request is generated, the UE has only to perform data communication using a selected RAT without additional processing.

If the existing traffic is present when a data request is generated, the UE may compare the existing RAT, that is, a RAT through which data communication is performed by the existing traffic, with a selected RAT to be used by newly generated traffic (e.g., a new RAT) in order to identify whether they are the same.

If communication is to be performed through the same RAT, the UE may process newly generated traffic through a new RAT. That is, the UE does not perform additional processing on the existing traffic.

If communication is to be performed through another RAT, a process of determining that traffic will be processed through which RAT may be performed. At step S440, the UE may perform communication using the selected RAT.

At step S450, the UE may update the quality information. That is, after actual data communication is completed, the UE may update quality information values of the quality information according to the results of actual communication. In this case, the UE may perform an update task on values that belong to the preference parameters of the quality information and that may be actually measured through actual data communication, such as speed or connection stability.

For example, if a speed value of WiFi was 0.5 and connection stability of WiFi was 0.2 in the quality information illustrated in FIG. 3, but speed is more than 0.5 and connection stability is less than 0.2 as the results of actual communication, the UE may increase the speed of WiFi to 0.6 and decrease connection stability to 0.1 in the quality information. The updated quality information values may be incorporated and used when a new data communication request is subsequently generated and a UE selects the best RAT by taking into consideration a user preference.

Figure 6A:
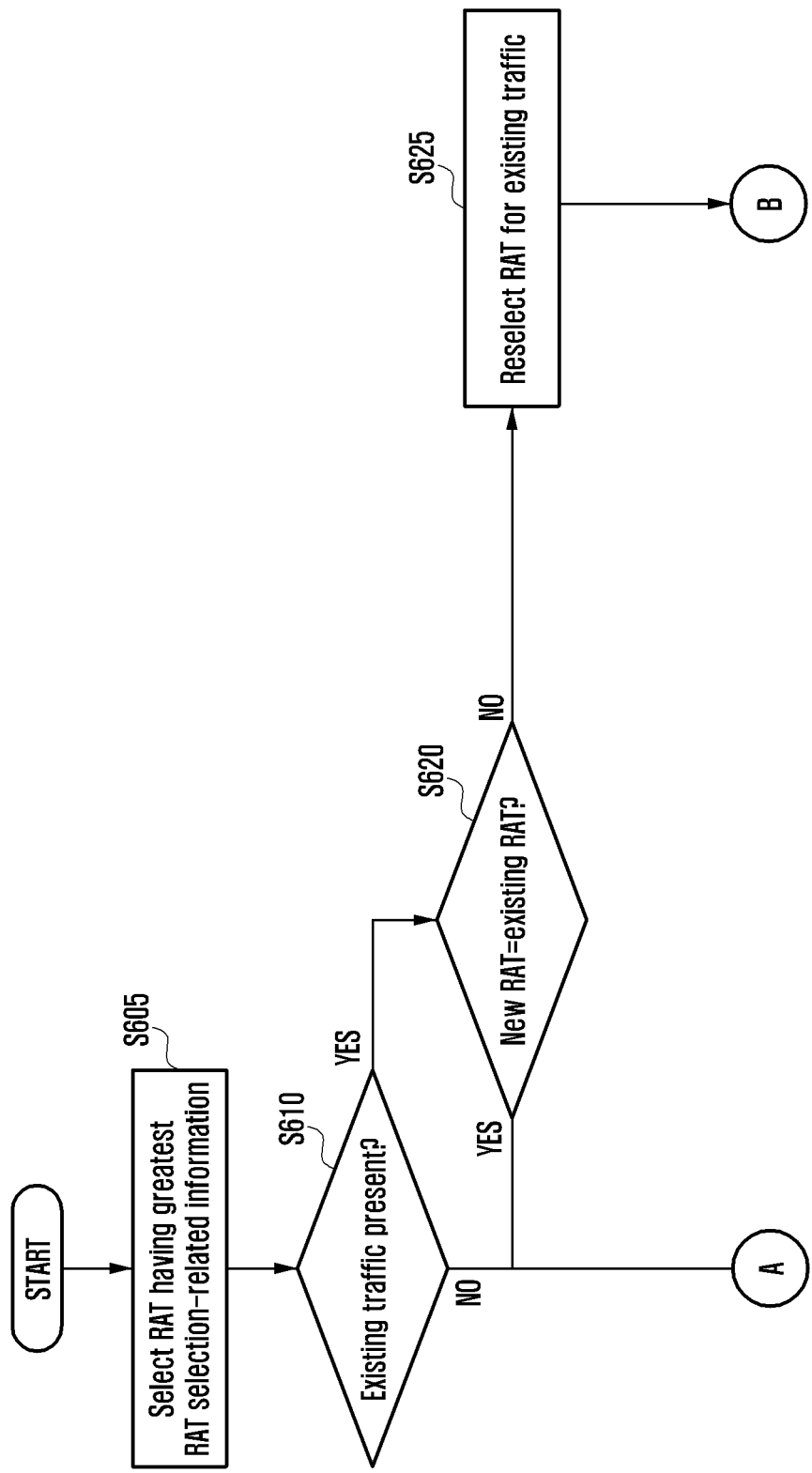
FIGS. 6A and 6B are flowcharts illustrating a process of selecting a RAT based on existing traffic, according to an embodiment of the present disclosure.
Figure 6B:
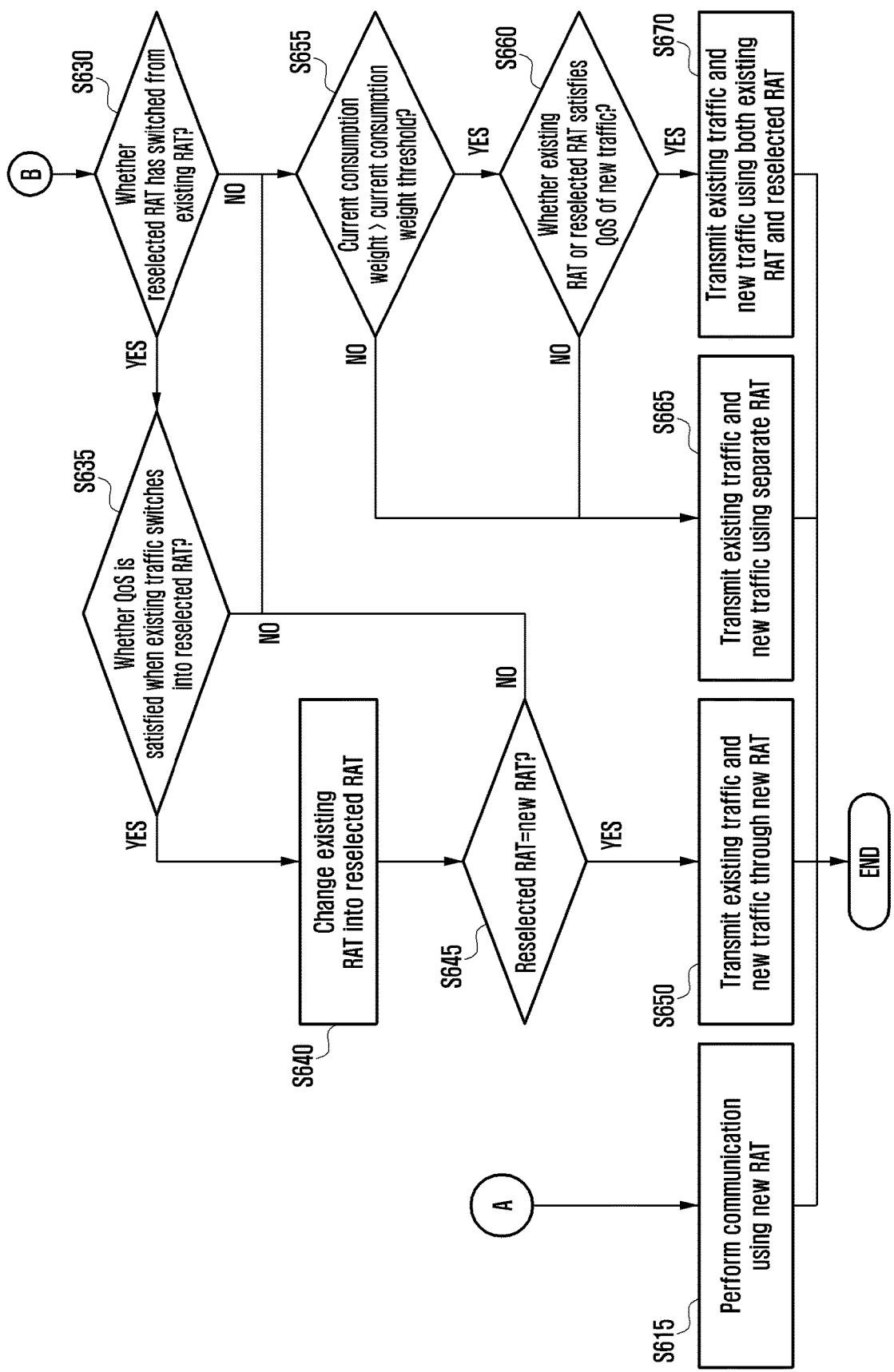

FIGS. 6A and 6B are flowcharts illustrating a process of selecting a RAT based on existing traffic, according to an embodiment of the present disclosure.

Referring to FIGS. 6A and 6B, after selecting a RAT having the largest RAT selection-related information value, a UE may select a RAT based on whether existing traffic is present or not.

At step S605, the UE may select a RAT having the largest RAT selection-related information value. A RAT selected by the UE may also be called a new RAT. At step S610, the UE may identify whether the existing traffic is present.

If the existing traffic is not present when a data request is generated, the UE may perform data communication using the new RAT at step S615 in FIG. 6B.

If the existing traffic is present when a data request is generated, at step S620, the UE may compare the existing RAT through which the existing traffic is transmitted with the new RAT in order to identify whether they are the same.

If the existing RAT and the new RAT are the same, at step S610, the UE may process newly generated traffic through the new RAT at step S615 in FIG. 6B. That is, the UE does not perform additional processing on the existing traffic.

If the existing RAT and the new RAT are different, at step S625, the UE may reselect a RAT for the existing traffic. The reason why the RAT reselection process is performed on the existing traffic is that UE information, such as the state of the UE or subscription information, may have been changed in the existing data. The UE may reselect a RAT for the existing traffic using weight information and quality information changed based on changed UE information. In this case, if a RAT for the existing traffic is reselected, the characteristics of traffic may not be changed. The UE may not take into consideration the characteristics of the traffic.

At step S630, the UE may identify whether the reselected RAT has switched from the existing RAT. That is, the UE may identify whether the reselected RAT has switched from the existing RAT by identifying whether the reselected RAT is the same as the existing RAT.

If the reselected RAT has switched from the existing RAT, at step S635, the UE may identify whether QoS is satisfied when the existing traffic switches into the reselected RAT. The UE may identify whether QoS for the reselected RAT exceeds a first threshold in order to determine whether the QoS is satisfied. In this case, the threshold may have been previously determined. The UE may determine whether communication quality can be maintained through the QoS although the existing traffic switches into the reselected RAT, and may determine whether or not to switch into the existing RAT.

If the QoS is satisfied, at step S640, the UE may change the existing RAT into the reselected RAT.

At step S645, the UE may identify whether the reselected RAT and the new RAT are the same.

If the reselected RAT and the new RAT are the same, at step S650, the UE may transmit the existing traffic and new traffic through the new RAT.

If the existing RAT is not changed, QoS for the reselected RAT is not satisfied, and the reselected RAT is different from the new RAT, at step S655, the UE may identify whether current consumption weight is larger than a second threshold (or current consumption weight threshold).

That is, if the existing RAT is not changed, QoS for the reselected RAT is not satisfied, or the reselected RAT is different from the new RAT, this may mean that the existing traffic and the new traffic is transmitted or received through another RAT.

If a plurality of RATs is used, current consumption of the UE may be increased. Accordingly, the UE compares current consumption weight with a threshold. If the current consumption weight is smaller than the threshold, the UE may perform communication using the plurality of RATs at the same time. That is, the UE may transmit or receive the existing traffic and new traffic through respective RATs.

In contrast, if the current consumption weight is greater than the threshold, only one RAT may be used. Accordingly, if the current consumption weight is greater than a current consumption weight threshold, at step S660, the UE may identify whether the existing RAT or the reselected RAT satisfies QoS of the new traffic. In order to use one RAT, the UE may identify whether the QoS is satisfied when the new traffic is transmitted or received through the existing RAT or the reselected RAT.

If the QoS is satisfied, at step S670, the UE may transmit the existing traffic and the new traffic using both the existing RAT and the reselected RAT.

The UE may identify whether the QoS is satisfied when the existing traffic is transmitted or received through the new RAT, and may transmit both the existing traffic and the new traffic through the new RAT.

In contrast, if, as a result of the comparison, the current consumption weight is smaller than the current consumption weight threshold or the existing RAT does not satisfy QoS of the new traffic, at step S665, the UE may transmit the existing traffic and the new traffic using a separate RAT.

According to an embodiment of the present disclosure, the new RAT may be referred to as a first RAT, the existing RAT may be referred to as a second RAT, and the reselected RAT may be referred to as a third RAT.

Figure 7:
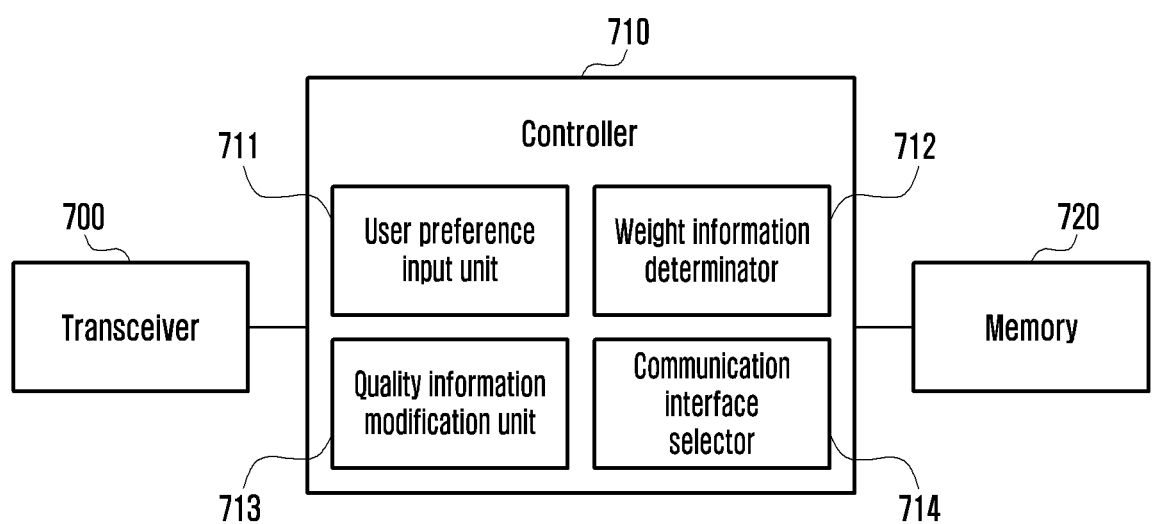
FIG. 7 is a diagram illustrating the configuration of a UE, according to an embodiment of the present disclosure.

FIG. 7 is a diagram illustrating the configuration of a UE, according to an embodiment of the present disclosure.

Referring to FIG. 7, the UE may include a transceiver 700, a controller 710, and a memory 720. The controller may be a circuit, an ASIC, or at least one processor. The transceiver 700 may perform communication with another network entity.

The transceiver 700 may perform communication with an eNB, and transmit or receive a signal for selecting a RAT.

The controller 710 may include a user preference input unit 711, a weight information determinator 712, a quality information modification unit 713, and a communication interface selection unit 714.

The user preference input unit 711 may function to receive a portion considered to be important by a user in selecting a communication interface (or RAT). According to an embodiment of the present disclosure, the preference parameters that may be input by the user may include a cost, current consumption, speed, and connection stability parameter. The user of the UE may select one or more of the given preference selection parameters. The user preference input unit 711 may receive preference information determined in response to a user selection.

The weight information determinator 712 may function to assign weight to each preference parameter based on a preference parameter selected by a user. If a user has selected the cost to have priority, weight may be determined like cost=0.7, current consumption=0.1, speed=0.1, and connection stability=0.1.

Such a method of setting weight information is an embodiment of the present disclosure, and weight configuration may be set in various ways depending on an actual implementation and a preference parameter selected by a user.

The weight information determinator 712 may modify the weight information based on UE information of the UE.

The quality information modification unit 713 may function to modify quality information according to corresponding conditions when an available RAT of a plurality of RATs mounted on the UE is changed. In this case, the quality information may include quality information for each user preference parameter so that the characteristics of each RAT may be incorporated into the quality information. If a new RAT has become available, the quality information modification unit 713 may add quality information for the corresponding RAT to the quality information. If an available RAT is no longer available, the quality information modification unit 713 deletes quality information for the corresponding RAT from quality information.

The communication interface selection unit 714 may select the best RAT of available RATs using weight information determined by the user preference input unit and the weight information determinator and quality information determined by the quality information modification unit. In this case, in a process of selecting the best RAT, the weight information, and the quality information may be dynamically modified using subscription information of a user, state information of the UE, and dynamic information, such as traffic characteristics.

The user preference input unit 711, the weight information determinator 712, the quality information modification unit 713, and the communication interface selection unit 714 may operate under the control of the controller 710.

The controller 710 may identify weight information according to preference information and modify the weight information based on UE information of the UE. The controller 710 may modify quality information based on the UE information. The controller 710 may dynamically modify the weight information and the quality information using the UE information from the UE, and may determine RAT selection-related information using the information.

The description for determining the RAT selection-related information is the same as those described above, and thus are omitted hereafter.

The controller 710 may select a RAT by taking the existing traffic into consideration. A detailed method of selecting a RAT by taking the existing traffic into consideration is the same as the aforementioned method and thus is omitted hereinafter.

When a radio access network selection event is triggered, the controller 710 may identify weight information according to the preference information, may modify the weight information based on UE information from the UE, and may select a RAT based on the modified weight information.

The controller 710 may control the operations of the UE according to various embodiments of the present disclosure.

The memory 720 may store the information necessary for the controller 710 to select a RAT. The memory 720 may store preference information input by a user, and may store weight information according to the preference information. When the weight information is modified based on UE information, the memory 720 may store the modified weight information.

The memory 720 may have stored initial quality information. When quality information is updated, the memory 720 may store the updated information.

If some of packets transmitted by a server through the TCP protocol are lost, a UE may notify the server that some packets have been lost by transmitting an SACK. The server that has received the SACK recognizes that some of the packets have been lost, and may enter a congestion avoidance phase in which a CWND is decreased. That is, if some of the packets are lost, the server may decrease the transfer speed of the packets by decreasing the CWND.

Figure 8:
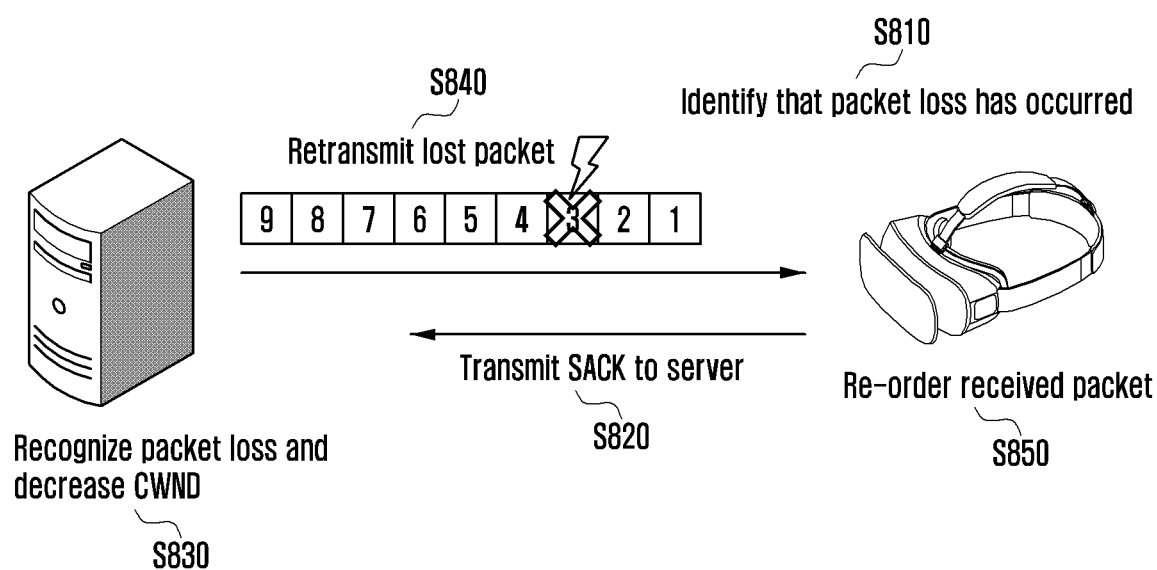
FIG. 8 is a diagram illustrating a packet retransmission process, according to an embodiment of the present disclosure.

FIG. 8 is a diagram illustrating a packet retransmission process, according to an embodiment of the present disclosure.

Referring to FIG. 8, at step S810, a UE may identify that a packet loss has occurred. As illustrated in FIG. 8, a No. 3 packet has been lost, but the contents of the present disclosure are not limited thereto.

At step S820, the UE may transmit an SACK to a server. The UE may notify the server that the loss of No. 3 packet has occurred by transmitting the SACK.

At step S830, the server recognizes the packet loss and may decrease the CWND. Alternatively, the server may decrease the CWND to a predetermined ratio (e.g., 50%).

At step S840, the server may retransmit the lost packet. The server may retransmit the lost No. 3 packet to the UE.

At step S850, the UE may re-order the received packet. The UE may transfer the re-ordered packet to an application layer.

If the CWND is decreased as described above, the amount of packets transmitted to the UE is decreased. Accordingly, if a packet has been lost due to a congestion situation, it may be helpful in solving the congestion situation. If the reason of a lost packet is not congestion, but is a problem, such as a radio channel error, the reason of the lost packet cannot be solved although the CWND is decreased. Accordingly, if the reason of a lost packet is not congestion, it is not necessary to decrease the CWND, and there is a problem in that throughput is unnecessarily decreased if the CWND is decreased according to a conventional technology. Therefore, there is a need for a server to retransmit a packet without decreasing the CWND.

Figure 9:
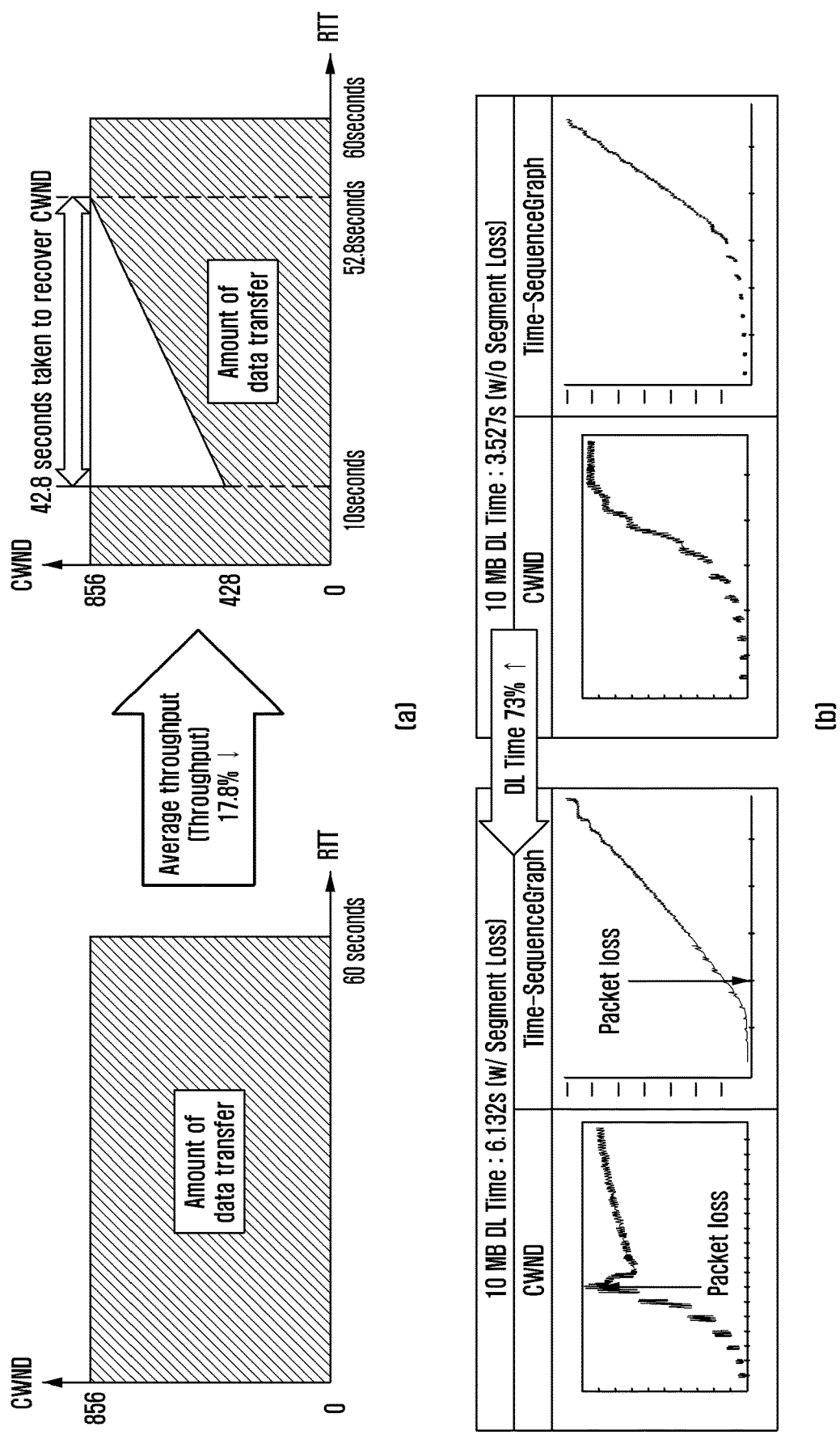
FIG. 9 is a diagram illustrating a reduction of throughput when a server decreases the CWND.

FIG. 9 is a diagram illustrating a reduction of throughput when a server decreases the CWND.

Referring to FIG. 9(a), it is assumed that a packet loss attributable to a radio channel error occurred 10 seconds after the transmission of the packet. In a conventional technology, a server decreases a CWND from 856 to 428 and thus the amount of packets for 60 seconds is decreased by 17.8%. That is, average throughput is decreased by 17.8% because the CWND is decreased.

Referring to FIG. 9(b), it is assumed that a packet loss occurred while a packet of 10 MB was downloaded. It may be seen that if a CWND is decreased at a specific ratio due to the packet loss, the time taken to download a file is about 5 seconds or more. In contrast, it may be seen that if the CWND is not decreased, the time taken to download the file is about 3.2 seconds. That is, it may be seen that if the CWND is decreased, the download time is increased by 73%.

An embodiment of the present disclosure teaches a method for a server to retransmit a lost packet without decreasing the CWND if the reason for the lost packet is not network congestion.

Figure 10:
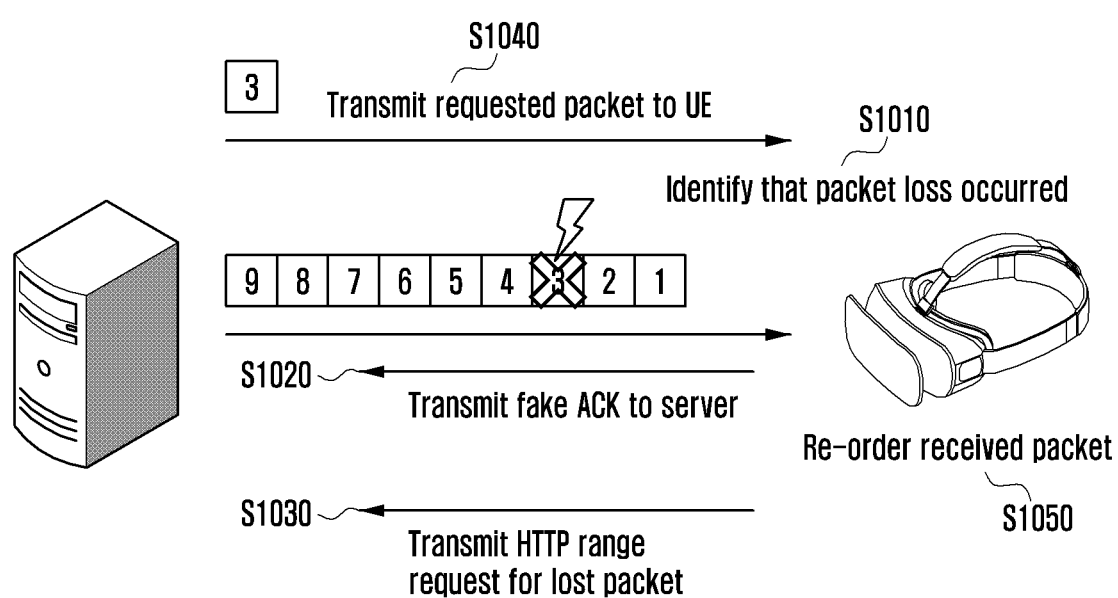
FIG. 10 is a diagram illustrating a packet retransmission process, according to an embodiment of the present disclosure.

FIG. 10 is a diagram illustrating a packet retransmission process, according to an embodiment of the present disclosure.

Referring to FIG. 10, at step S1010, a UE may identify that a packet loss occurred. As illustrated in FIG. 10, a No. 3 packet has been lost, but the contents of the present disclosure are not limited thereto.

The UE that has identified the packet loss may identify the reason of the lost packet.

If the reason of the lost packet is congestion, the UE may perform the process illustrated in FIG. 8. In this case, if the reason of the lost packet is not congestion (e.g., a radio channel error), the UE may perform the following operations.

At step S1020, the UE may transmit a positive acknowledgement (ACK) to a server. In this case, since the positive ACK is transmitted although the packet has not been properly received, the positive ACK may be interchangeably used with a fake ACK. The reason why the UE transmits the fake ACK is so the CWND will not be increased by hiding from the server that the packet has been lost.

At step S1030, the UE may transmit a transmission request message for the lost packet. In this case, in order to request the transmission of the lost packet, the UE may use a hypertext transfer protocol (HTTP). The request message may include an HTTP request message (e.g., a GET request message or an HTTP range request message). The UE may request the transmission of the lost packet from the server using the GET request. Alternatively, the UE may include a bit range for the No. 3 packet in the header part of the GET request and request the transmission of No. 3 packet. The request may be called the HTTP range request. The UE may request the transmission of the lost packet using the HTTP layer not the TCP layer.

As illustrated in FIG. 10, the UE requests the transmission of No. 3 packet from the server through the HTTP range request.

At step S1040, the server may transmit the packet, requested by the UE, to the UE. As illustrated in FIG. 10, the server may retransmit the lost No. 3 packet to the UE.

At step S1050, the UE may re-order the received packet. When No. 3 packet is received, the UE may re-order order of the received packet and the existing received packet and transfer the re-ordered packets to the application layer.

If the reason of a lost packet is not congestion, for example, if the reason of a lost packet is a radio channel error, the UE may transmit a fake ACK to the server so that the server does not decrease a CWND, thereby preventing a reduction of throughput from the server.

Since the CWND is not decreased, the UE can use the CWND to recover a plurality of packets if a radio channel error has been solved.

A reduction of throughput can be prevented and a lost packet can be received again by only modifying the operation of the UE without modifying an application and the server because the transmission of the lost packet is requested using the application layer (e.g., the HTTP layer).

Figure 11A:
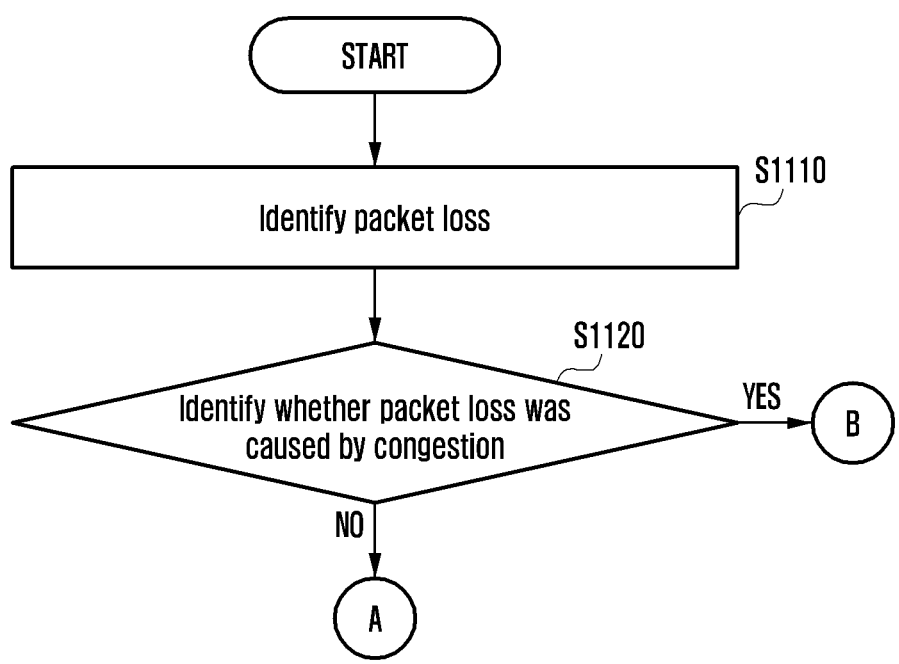
FIGS. 11A and 11B are flowcharts illustrating the packet retransmission process, according to an embodiment of the present disclosure.
Figure 11B:
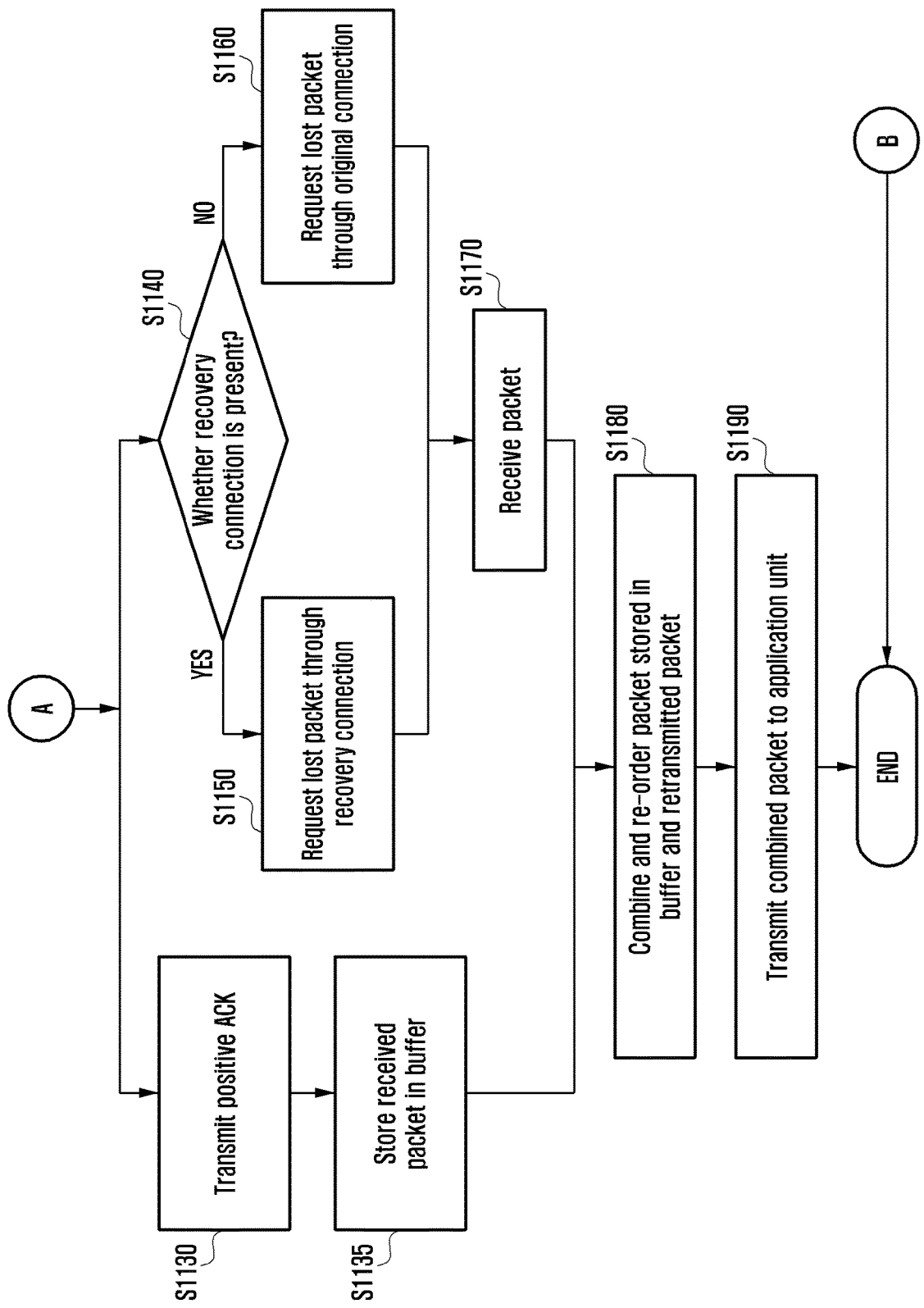

FIGS. 11A and 11B are flowcharts illustrating a packet retransmission process, according to an embodiment of the present disclosure.

Referring to FIGS. 11A and 11B, at step S1110, a UE may identify a packet loss. The UE that has identified the packet loss may identify whether the packet loss was caused by congestion at step S1120. If the packet loss was caused by congestion, the process ends. If, as a result of the identification, the packet loss is not caused by congestion, at step S1130, the UE may transmit a positive ACK. The UE may transmit the positive ACK with respect to the lost packet. If a packet has been lost, but the positive ACK is transmitted, the ACK may be called a fake ACK.

At step S1135, the UE stores the received packet in a buffer. That is, the UE may have stored a packet that has not been lost and has been normally stored until the lost packet is received. The process then goes to step S1180.

At step S1140, the UE may identify whether a recovery connection (or restoration connection) is present. The recovery connection means a connection generated for packet retransmission in addition to the original connection already generated between the UE and a server. If the recovery connection is present, at step S1150, the UE may request the lost packet through the recovery connection. In contrast, if the recovery connection is not present, at step S1160, the UE may request the lost packet through the original connection.

At step S1170, the UE may receive the packet. In this case, the server may transmit the packet through the application layer (e.g., the HTTP layer). The UE may receive the packet from the server through the application layer (e.g., HTTP layer). The UE can receive the lost packet through only the operation of the UE without modifying the server and an application by receiving the lost packet using another layer other than the TCP layer.

At step S1180, the UE may combine and re-order a packet stored in a buffer and the retransmitted packet.

At step S1190, the agent unit of the UE may transmit the combined packet to the application unit. The aforementioned recovery connection may be set up depending on whether the original connection supports asynchronous pipelining at an operation in which the server and the UE set up the original connection. Furthermore, according to an embodiment of the present disclosure, if the recovery connection is not present, a method of requesting the lost packet through the original connection at step S1160 has been described as an embodiment, but the contents of the present disclosure are not limited thereto.

At step S1160, the UE may set up a recovery connection depending on whether the original connection supports asynchronous pipelining, and may request the lost packet using the recovery connection. If the original connection does not support asynchronous pipelining, the UE may set up a recovery connection and request the lost packet using the recovery connection.

Figure 12:
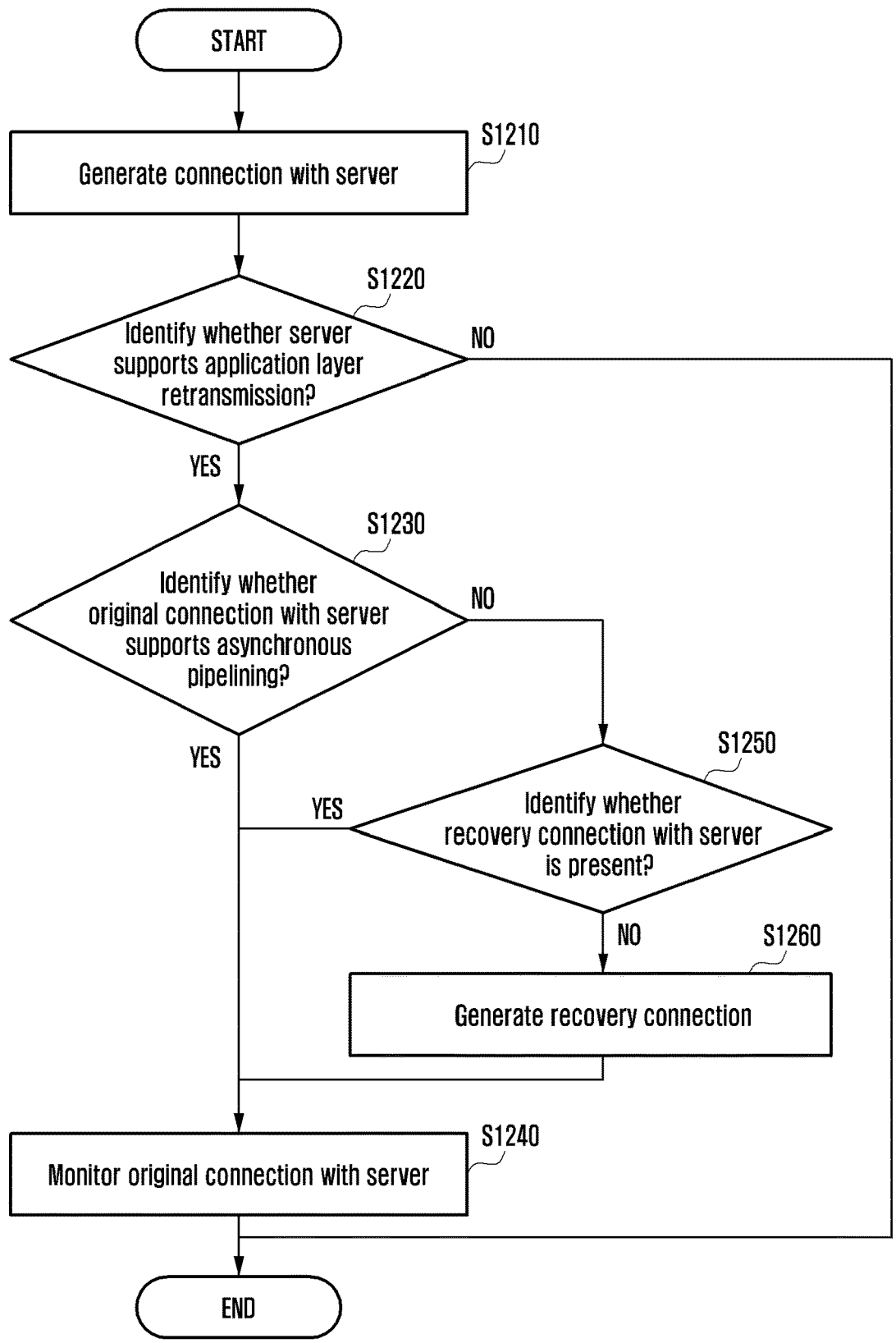
FIG. 12 is a flowchart illustrating a process of generating a recovery connection, according to an embodiment of the present disclosure.

FIG. 12 is a flowchart illustrating a process of generating a recovery connection, according to an embodiment of the present disclosure.

Referring to FIG. 12, at step S1210, a UE may generate a connection with a server. In this case, the application unit of the UE and the server may generate the connection.

The UE may transmit or receive a packet through the connection generated with the server. If the UE does not receive some of packets from the server, it may request retransmission from the server.

According to an embodiment of the present disclosure, the UE may request packet retransmission from the server through the application layer.

At step S1220, the UE may identify whether the server supports application layer retransmission.

According to an embodiment of the present disclosure, in order to request the transmission of a lost packet, the UE may use an HTTP request message (e.g., a GET request or HTTP range request). The HTTP request message means a request transmitted through the application layer. In order to identify whether the server supports application layer retransmission, the UE may identify whether the server supports an HTTP range request.

The application unit of the UE may transmit a GET request to the server through the original connection. For example, if a moving image is watched through a website such as YouTube®, the application unit of the UE may request the moving image from a YouTube® server using a GET request. In this case, the UE may identify whether a range header is present in the GET request transmitted by the application unit. That is, the agent unit of the UE may identify the request transmitted by the application unit. If a range header is present in the request, this may mean that the server supports the HTTP range request.

In contrast, if a range header is not present in the request, the server may transmit an HTTP range request, may identify whether a response to the request is received, and may identify whether the server supports the HTTP range request. The UE may transmit an HTTP range request through the original connection or recovery connection. If a response to the HTTP range request is received, the UE may identify that the server supports the HTTP range request.

The UE may store whether the server supports the HTTP range request and may subsequently use the stored information.

According to an embodiment of the present disclosure, the HTTP range request has been illustrated, but the present disclosure is not limited to the embodiment. That is, an HTTP range request transmitted through the application layer in order to request the transmission of a lost packet has been illustrated as being used, and another message transmitted through the application layer may be used.

If the server supports retransmission through the application layer, at step S1230, the UE may identify whether the original connection with the server supports asynchronous pipelining. If asynchronous pipelining is supported, it may mean that a server can transmit data for other requests regardless of whether all of data being transmitted has been fully transmitted when the server receives another request while transmitting the data. That is, if asynchronous pipelining is supported, data transmission for a plurality of requests can be performed simultaneously through the original connection.

The UE may identify whether the connection between the UE and the server supports asynchronous pipelining through the GET request transmitted by the application unit and the response header of the server. A case where asynchronous pipelining is supported may include a case where HTTP/2 or quick user datagram protocol (UDP) internet connections (QUIC) is supported, for example.

If asynchronous pipelining is not supported (e.g., HTTP 1.1), when another request is received during data transmission, the server transmits data for the request after fully transmitting all of the data that is being transmitted. In contrast, if asynchronous pipelining is supported, when another request is received during data transmission, the server may transmit data for the request immediately when it receives the request.

If asynchronous pipelining is not supported, the transmission of a lost packet may be delayed due to data transmission in the original connection. Accordingly, it is not necessary to generate a separate connection.

In contrast, if asynchronous pipelining is supported, the transmission of a lost packet is not delayed although data is transmitted through the original connection and it is not necessary to generate a separate connection.

If the original connection supports asynchronous pipelining, at step S1240, the UE may identify whether a packet loss is generated by monitoring the original connection with the server. That is, the UE may not generate a separate connection.

If, as a result of the monitoring, a packet loss is generated, the UE may request the retransmission of the lost packet through the process illustrated in FIG. 11.

That is, when a packet loss is identified, the UE may identify the reason of the lost packet. If the reason of the lost packet is not congestion, the UE may request the lost packet along with the positive ACK. In this case, since a separate connection is not present, the UE may request packet retransmission through the original connection. Specifically, the UE may request the retransmission of the lost packet by transmitting an HTTP range request through the original connection.

When the retransmission of the lost packet is requested, the UE may match the lost packet with the content range of the HTTP range request. That is, the UE may match the sequence number (e.g., TCP segment number) of the lost packet with an HTTP sequence number, and may request the transmission of the lost packet through the HTTP message.

In contrast, if the original connection does not support asynchronous pipelining, at step S1250, the UE may identify whether a recovery connection with the server is present.

If the recovery connection is already present, the UE does not need to generate a separate connection. At step S1240, the UE may monitor whether a packet loss is generated through the original connection.

In contrast, if a recovery connection is not present, at step S1260, the UE may generate a recovery connection. The recovery connection may mean a new connection different from the original connection. Furthermore, at step S1240, the UE may monitor whether a packet loss occurs through the original connection.

As described above, the reason why the UE identifies whether asynchronous pipelining is supported and whether a recovery connection is present is for decreasing overload for generating and maintaining a recovery connection.

If, as a result of the monitoring of the original connection, a packet loss is identified, the UE may request the retransmission of the lost packet through the process illustrated in FIG. 11.

If a packet loss is identified, the UE may identify the reason of the lost packet. If the reason of the lost packet is not congestion, the UE may request the lost packet along with the positive ACK. In this case, since the recovery connection has been generated, the UE may request the transmission of the lost packet from the server using the recovery connection. Specifically, the UE may request the retransmission of the lost packet by transmitting an HTTP range request through the recovery connection.

When the retransmission of the lost packet is requested, the UE may match the lost packet with the content range of the HTTP range request. That is, the UE may match the sequence number (e.g., TCP segment number) of the lost packet with the HTTP sequence number, and may request the transmission of the lost packet through an HTTP message.

According to an embodiment of the present disclosure, the original connection may be interchangeably used with a first connection, and the recovery connection may be interchangeably used with a second connection.

An embodiment of the present disclosure in which a lost packet is requested through the application layer is applied to a case where the reason of a lost packet is not congestion.

A UE needs to identify whether the reason of a lost packet is congestion. A method of identifying the reason of a lost packet may include various methods. If it is determined that the reason for a lost packet is not congestion, it is important to perform a conservative operation. If it is determined that the lost packet is not because of congestion and thus a congestion window is not reduced, then many packets may be additionally lost due to an increased network load and this may lead to worse results compared to a case where the present disclosure is applied.

As an embodiment of the present disclosure of a determination method, a method of determining whether the reason for a lost packet is congestion by taking into consideration the ratio of connections that belong to connections present in a UE and through which a packet loss has occurred and a change of signal intensity may be taken into consideration. If the ratio of connections through which a packet loss has occurred is a specific value or more and if signal intensity becomes instantly poorer, the reason of the lost packet may be determined to not to be congestion.

A UE includes a plurality of connections, such as a connection for the reception of a push message and connections generated by a plurality of applications being driven in the foreground or background. In this case, if the ratio of connections is determined, in order to improve accuracy, the connection may be grouped for each target IP address, each server or each application, and the ratio of groups in which a packet loss has occurred may be determined.

There is a good possibility that an instant packet loss occurred because congestion is simultaneously generated in connections with a plurality of servers and thus signal intensity of a radio channel becomes poorer rather than the possibility that an instant packet loss occurred. If the ratio of connections through which a packet loss occurred is high, the packet loss may be determined to be caused by other factors rather than congestion.

However, the reason of a lost packet generated in a plurality of connections may be caused by a bottleneck phenomenon in an eNB or a radio access point (AP). The reason of a lost packet needs to be finally determined by taking into consideration a change of signal intensity. If a packet loss is generated due to a bottleneck phenomenon in the eNB or the radio AP, there is a good possibility that the packet loss was generated due to an increase of the number of users, and a relation with a change of signal intensity between the UE and the eNB or radio AP is low. If a packet loss was generated and at that instant, signal intensity becomes poor, the reason of the lost packet may be determined to be congestion (e.g., to determine the reason of a packet loss based on only signal intensity may be inaccurate because the intensity of a radio channel varies over time and a change in the intensity of a radio channel signal and congestion may occur at the same time).

If any connection with a server is present, a UE may periodically transmit a packet in order to prevent the disconnection (e.g., closing) of a recovery connection. In this case, the transmitted packet may be called a keep-alive packet.

Figure 13:
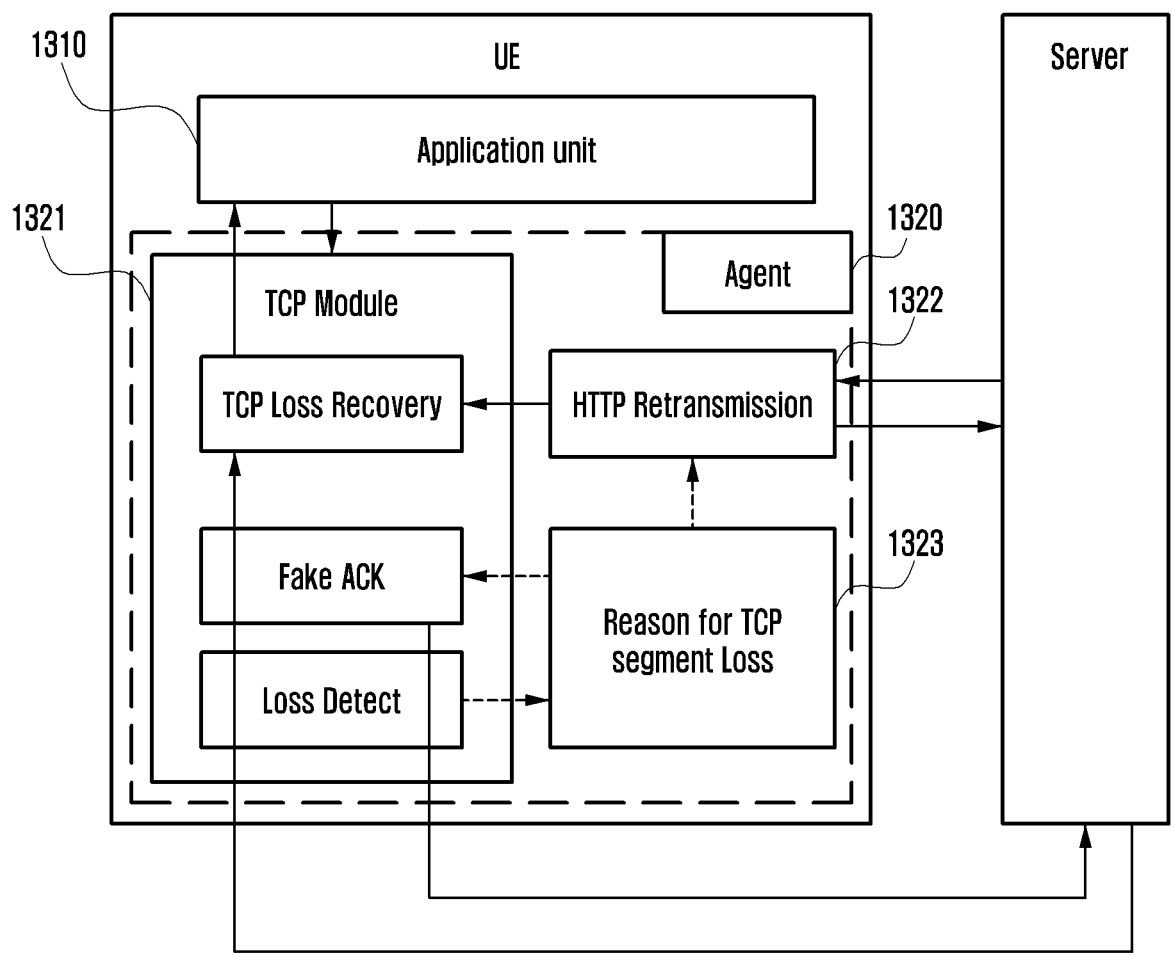
FIG. 13 is a diagram illustrating the configuration of a UE, according to an embodiment of the present disclosure.

FIG. 13 is a diagram illustrating the configuration of a UE, according to an embodiment of the present disclosure.

Referring to FIG. 13, the UE may include an application unit 1310 and an agent unit 1320.

The agent unit 1320 may include a TCP module 1321, an HTTP retransmission unit 1322, and a reason-for-TCP-segment loss unit 1323.

The agent unit 1320 may identify whether a server supports the retransmission of the application layer. The agent unit 1320 may identify whether the server supports the retransmission of the application layer based on whether a range header is present in a request transmitted from the application unit to the server or whether a response to a range request transmitted by the server is received. The description is the same as those described above, and thus is omitted hereinafter.

The agent unit 1320 may identify whether asynchronous pipelining is supported. The agent unit 1320 may identify whether asynchronous pipelining is supported through a request transmitted from the application unit to the server and the response header of the server for the request, and detailed contents are the same as those described above.

A packet loss detector included in the TCP module 1321 of the agent unit 1320 may identify whether a packet loss is present by monitoring for a packet loss.

If the packet loss is identified, the reason-for-TCP-segment loss unit 1323 may identify the reason of the lost packet. The present disclosure may be applied to a case where the reason of a lost packet is not congestion. If the reason for a lost packet is not congestion, a fake ACK unit included in the TCP module 1321 may transmit a fake ACK to the server.

The HTTP retransmission unit 1322 may request the lost packet from the server through the application layer. The HTTP retransmission unit 1322 may request the lost packet using an HTTP range request.

In response to the request, the server may transmit the lost packet. The HTTP retransmission unit 1322 may receive the lost packet and transmit it to the TCP module 1321. The TCP loss recovery unit of the TCP module 1321 may combine and re-order a packet that is being buffered and a retransmitted packet and transmit it to the application unit 1310.

Through such a method, the server does not decrease a CWND, and the UE may receive a lost packet without a reduction of throughput.

The UE may further include a transceiver, a controller, and a memory.

The transceiver may perform communication with another device. The transceiver may receive a packet from the server and transmit a response thereto. That is, the packet may be transmitted to the TCP module 1321 through the transceiver.

The controller may control all of entities included in the UE. The application unit 1310 and the agent unit 1320 may operate under the control of the controller.

When a packet loss is generated, the controller may identify the reason of a packet loss. If the reason of the packet loss is not congestion, the controller may transmit a positive ACK to the server, may request the transmission of the lost packet from the server through a HTTP layer, and may receive the lost packet from the server.

The controller may control all of the operations of the UE described in embodiments of the present disclosure.

The memory may store information transmitted or received in various embodiments of the present disclosure. The memory may store a packet that belongs to packets received from the server and that has not been transmitted to the application unit. Furthermore, the memory may store information about whether the server supports the retransmission of the application layer.

With the emergence of the VR industry, VR content and a VR-related devices are emerging. The VR-related device may include a photographing device for producing VR content and a VR terminal (e.g., head mounted display (HMD)) for using VR content. In this case, VR means an interface between a human and a computer, which produces a specific environment or situation through a computer and makes a person who uses the specific environment or situation feel like they are interacting with an actual surrounding environment or situation.

With the development of the VR industry, VR content is produced by photographing all of the directions around a photographing device which is capable of 360-degree photographing (e.g., a camera capable of 360-degree photographing) using the photographing device. A user can watch the content through a VR UE and can watch content in the direction desired by the user. If the photographing direction of the camera is rotated, the direction of the VR content is changed. A phenomenon in which a screen is rotated while the user watches the VR content through the VR UE may occur. The user may feel inconvenient while watching the content, and thus there is a need for a method capable of solving the problem. In an embodiment of the present disclosure, a VR UE may be interchangeably used with a UE.

Figure 14:
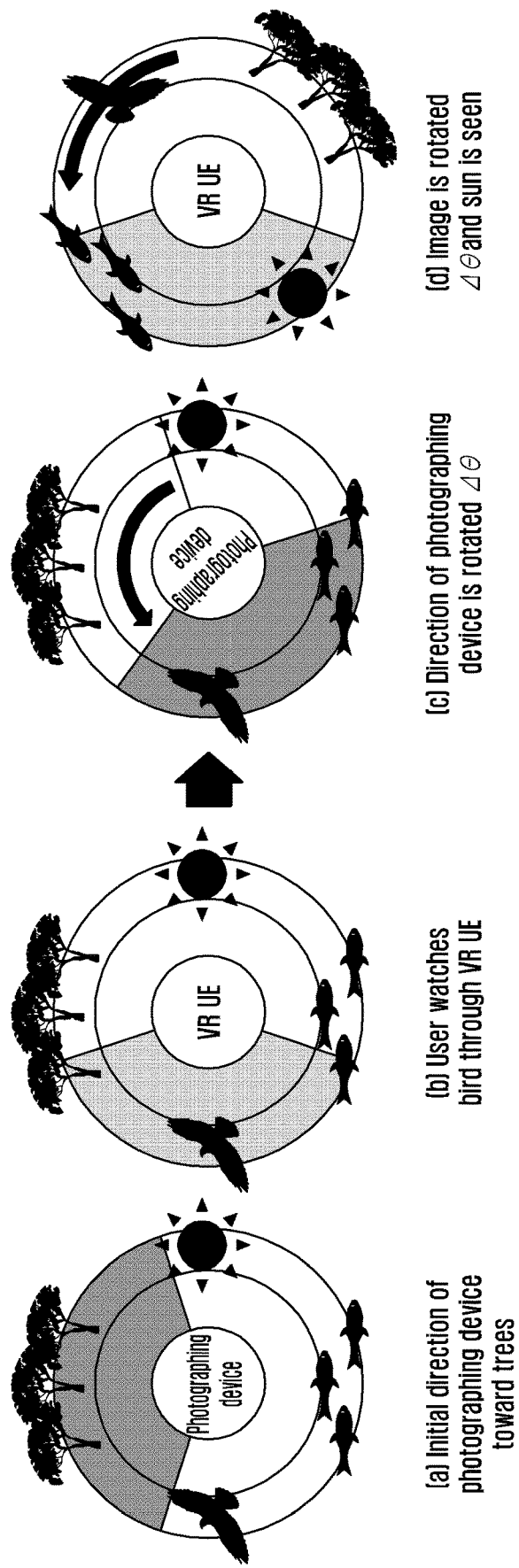
FIG. 14 is a diagram illustrating a problem if the photographing direction of a photographing device is changed.

FIG. 14 is a diagram illustrating a problem if the photographing direction of a photographing device is changed.

Referring to FIG. 14(a), (b), a 360-degree photographing device may be directed toward trees. In this case, the 360-degree photographing device may photograph all of situations or environment 360 degrees. A user may watch content in a desired direction using a VR UE. In FIG. 14(a), (b), it is assumed that the user watches a bird using the VR UE.

If the photographing direction of the photographing device is changed, a screen being watched by the user is changed, and the user may get confused.

Referring to FIG. 14(c), (d), the photographing direction of the photographing device is turned at a specific angle, and thus the photographing direction of the photographing device is turned toward the bird and fishes.

Since the user watches the same direction, the screen displayed through the VR UE is changed. In FIG. 14(c), (d), a screen displayed through the VR UE may be changed to the fishes and the sun in response to the rotation of the photographing device.

Figure 15:
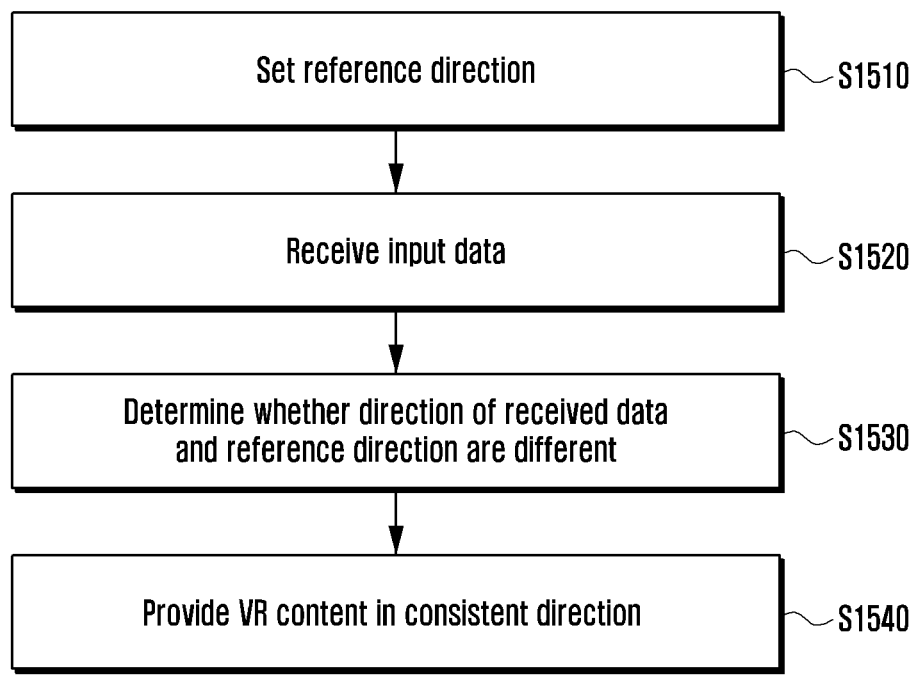
FIG. 15 is a flowchart illustrating a method for providing an image, according to an embodiment of the present disclosure.

When a screen is suddenly changed as described above, a user may feel inconvenient. There is a need for a method for providing VR content in the same direction although the photographing direction of a photographing device is changed. FIG. 15 is a flowchart illustrating a method for providing an image, according to an embodiment of the present disclosure.

Referring to FIG. 15, at step S1510, a VR-related device may set a reference direction. The reference direction means a direction, that is, the reference by which a photographing device generates VR content in a coherent direction. The reference direction may be set as the direction of the first data generated by the photographing device. The direction of the data may mean photographing direction information of the photographing device for generating the data. Alternatively, the reference direction may be set by the setting of a VR content producer. Alternatively, the reference direction may have been previously determined. The reference direction and the direction information of the data may include the x coordinates, y coordinates, and z coordinates of a photographing direction and angle information for x, y, and z. Alternatively, the direction information of the data may include information of an angle rotated with respect to the reference direction. The content may be applied to various embodiments of the present disclosure. According to an embodiment of the present disclosure, a reference direction may be interchangeably used with reference direction information.

According to an embodiment of the present disclosure, a VR-related device may include a photographing device, a server, or a VR UE. The photographing device, server, or VR UE may perform a method of generating VR content in the same direction. In an embodiment of the present disclosure, VR content in the same direction may mean VR content generated using data having the same direction.

At step S1520, the VR-related device may receive data. The VR-related device may receive data, and the data may include data for a video image.

After the data is received, at step S1530, the VR-related device may determine whether the direction of the received data and the reference direction are different.

In this case, the VR-related device may determine whether the direction of the received data and the reference direction are different or may determine whether a difference between the direction of the received data and the reference direction is greater than a threshold. According to an embodiment of the present disclosure, the direction of data may be interchangeably used with direction information of data.

In order to determine whether the direction of the received data and the reference direction are different, the VR-related device may identify meta data included in the data. The meta data may have included the direction of the data for each playback time. The VR-related device may determine whether the reference direction and the direction of the data are different using the meta data. If the reference direction and the direction of the received data are different, at step S1540, the VR-related device may provide VR content produced in the same direction through correction.

In this case, the VR-related device may correct the direction of the received data, may generate VR content in a consistent direction, and may provide the VR content (e.g., a first method). The VR-related device according to the first method may include a server or a photographing device.

Alternatively, the VR-related device may adjust a sensor and provide the user with VR content in a consistent direction (e.g., second method). The VR-related device according to the second method may include a VR UE.

Figure 16:
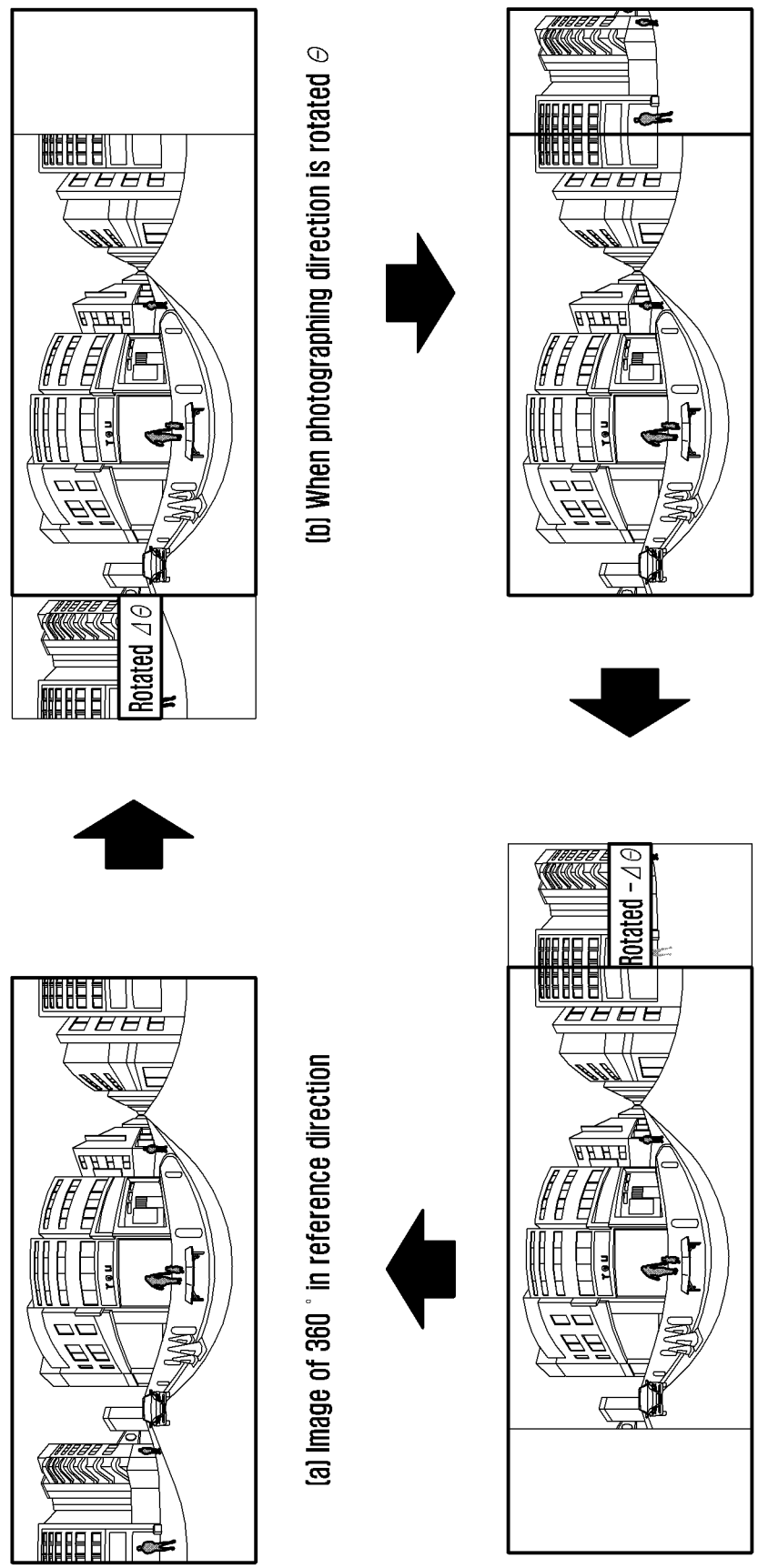
FIG. 16 is a diagram illustrating a method for providing VR content according to an embodiment of the present disclosure.

FIG. 16 is a diagram illustrating a method for providing VR content, according to tan embodiment of the present disclosure.

FIG. 16 provides a method for a server or VR photographing device to provide an image in a consistent direction using an angle adaptive filter. Referring to FIG. 16, the VR-related device may set a reference direction in FIG. 16(a), and may determine whether the direction of data is different from the reference direction in FIG. 16(b). The reference direction may mean the direction of the first input data. Alternatively, the reference direction may be set by the setting of a VR content producer. Alternatively, the reference direction may have been previously determined.

The direction of the data may mean a photographing direction of a photographing device for generating the data. That is, the direction information of the data may be determined as information for the direction photographed by the photographing device when generating the data.

If the VR-related device is a photographing device, the photographing device may determine whether a photographing direction and a reference direction are different. If the VR-related device is a server, the server may determine whether the direction of data is different from a reference direction using information included in data received from a photographing device. Alternatively, the VR-related device may identify whether a difference between the direction of the data and the reference direction is a threshold or more.

In FIG. 16(c), the VR-related device may identify a difference between the direction of the data and the reference direction. In this case, a difference between the direction of the data and the reference direction may be interchangeably used with a direction change value.

Accordingly, in FIG. 16(d), the VR-related device may generate VR content using the direction change value. Specifically, the VR-related device may generate VR content in a consistent direction by correcting the VR content by the direction change value using the filter.

Figure 17:
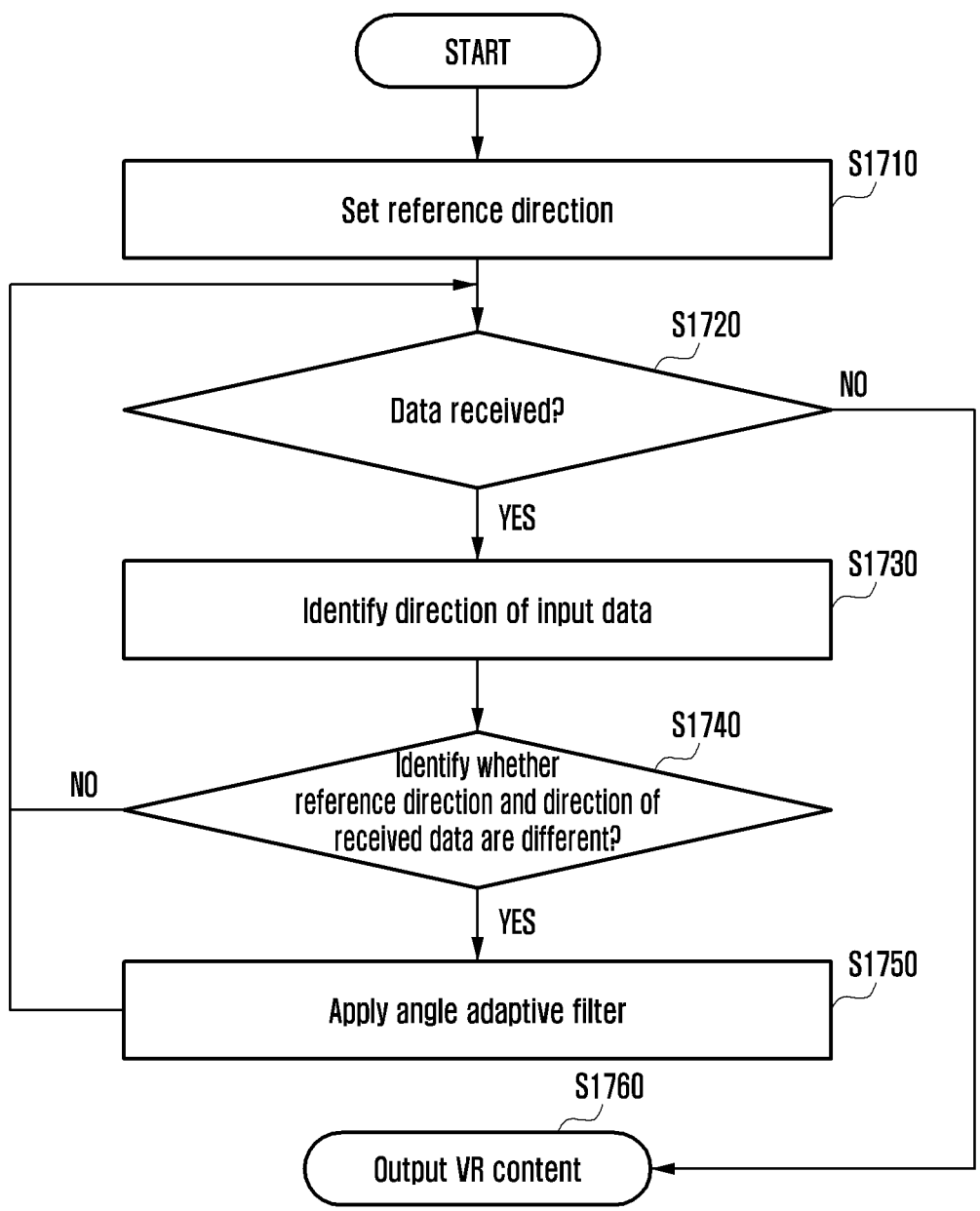
FIG. 17 is a flowchart illustrating a method for a photographing device to provide VR content, according to an embodiment of the present disclosure.

FIG. 17 is a flowchart illustrating a method for a photographing device to provide VR content, according to an embodiment of the present disclosure.

At step S1710, the photographing device may set a reference direction. The photographing device may set the first direction in which photographing has started in order to generate VR content as the reference direction. Alternatively, the reference direction may be set by the setting of a VR content producer. Alternatively, the reference direction may have been previously determined.

At step S1720, the photographing device may determine whether data is received. The received data may include information for generating image data through the photographing device.

When the data is received, at step S1730, the photographing device may identify the direction of the data. The photographing device may identify the direction of the received data based on a photographing direction. That is, the photographing device may identify the photographing direction using a direction sensor included therein. The direction of the received data may be the same as the photographing direction.

At step S1740, the photographing device may identify whether the reference direction and the direction of the received data are different.

If the reference direction and the current direction are not different, the photographing device may continue to receive data without separate correction.

In contrast, if the reference direction and the current direction are different, at step S1750, the photographing device may apply the angle adaptive filter.

That is, the photographing device may change the direction of data generated due to a change of the photographing direction using the angle adaptive filter. Specifically, the photographing device may calculate a difference between the reference direction and the direction of the received data. The received data may be rotated in an opposite direction by the calculated difference. For example, if the photographing direction has been rotated by θ, the photographing device may rotate data whose direction has been changed by −θ using the angle adaptive filter.

The photographing device returns to step S1720 and determines whether data is received. If data is received, the photographing device compares the reference direction with the direction of the data. If the reference direction and the direction of the data are different, the photographing device corrects the direction of the data.

Furthermore, if data is not received, at step S1760, the photographing device may output VR content.

If, as a result of the comparison, the direction of the data is different from the reference direction, the photographing device may generate VR content in a consistent direction by changing the direction of the received data.

Although the reference direction and the direction of the data are different at step S1740, if a difference between the reference direction and the direction of the received data is less than a threshold, the photographing device may not apply the angle adaptive filter. That is, the photographing device may correct the direction of the received data only when a difference between the reference direction and the direction of the received data is the threshold or more. In this case, the threshold may be set as an angle at which a user may not feel inconvenient although the direction is changed. The threshold may have been previously determined or may be set by a VR content producer.

Figure 18:
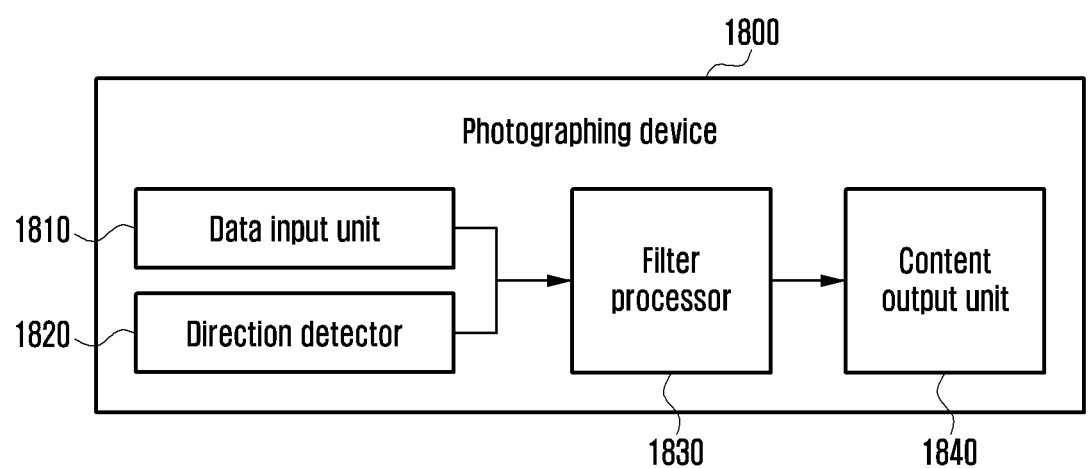
FIG. 18 is a diagram illustrating the configuration of the photographing device for providing VR content, according to an embodiment of the present disclosure.

FIG. 18 is a diagram illustrating the configuration of a photographing device 1800 for providing VR content, according to an embodiment of the present disclosure.

Referring to FIG. 18, the photographing device may include a data input unit 1810, a direction detector 1820, a filter processor 1830, and a content output unit 1840.

The photographing device may include a controller. The controller may control the data input unit 1810, the direction detector 1820, the filter processor 1830, and the content output unit 1840 included in the photographing device.

The data input unit 1810 may receive data. If the photographing device is a camera, the data input unit may mean a portion through which video is received through a camera lens.

The direction detector 1820 may detect the direction of the photographing device. The direction detector 1820 may detect the direction of the photographing device using a direction sensor within the photographing device.

The filter processor 1830 may determine whether or not to apply the filter to the received data based on the direction of the photographing device, and may process video. If the direction of the received data and the direction of the photographing device are different, the filter processor 1830 may calculate a difference between the reference direction and the direction of the received data, and may rotate the received data in an opposite direction by the calculated difference.

The content output unit 1840 may output generated content. The content output unit 1840 may generate content by combining data corrected by the filter processor 1830 and input data, and may output the generated content.

In addition, the controller may set or receive a reference direction. The controller may provide the reference direction to the filter processor so that the filter processor determines whether or not to apply the filter. In this case, the filter processor may directly compare the reference direction and the direction of data and modify the direction of the data. Alternatively, the controller may directly determine whether the direction of data determined by the direction determinator and the reference direction are different, and may control the filter and the filter processor.

The photographing device may further include a transceiver and a memory. The controller may control the transceiver and the memory.

The transceiver may perform communication with another device. The transceiver may provide a server or VR UE with generated content. That is, the transceiver may transmit content, output by the content output unit 1840, to another device. The transceiver may receive content generated by another device.

The memory may store generated content. The memory may store a set reference direction and received data.

Figure 19:
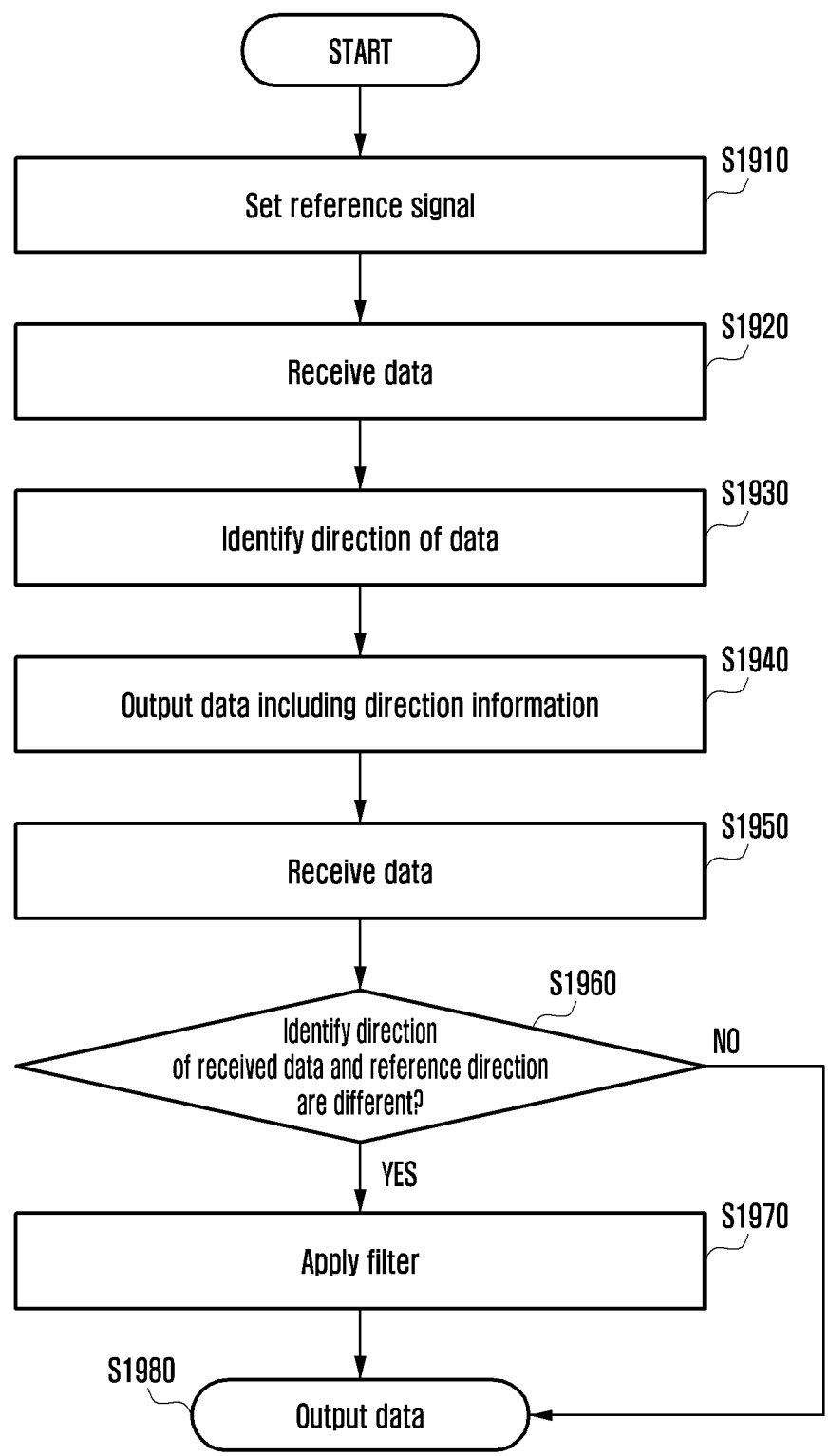
FIG. 19 is a flowchart illustrating a method for a server to provide VR content, according to an embodiment of the present disclosure.

FIG. 19 is a flowchart illustrating a method for a server to provide VR content, according to an embodiment of the present disclosure.

Step S1910 to step S1940 are steps performed by the photographing device. That is, the photographing device may set a reference signal at step S1910, may receive data at step S1920, and may identify the direction of the received data at step S1930. The photographing device may identify the direction of the received data based on a photographing direction.

The photographing device may output data including direction information according to the identified direction at step S1940. In this case, the direction information may include meta data. The meta data may include the direction of the data for each playback time. The direction information may include the x coordinates, y coordinates, and z coordinates of the photographing direction and angle information for x, y, and z. The operation of setting the reference direction may be omitted.

In contrast, the direction information may include information about an angle turned around the reference direction. In this case, the operation of setting the reference direction may be performed.

The server may set the reference direction. In this case, the reference direction set in the photographing device may be included in data and transmitted. The server may identify the reference direction of the photographing device. Accordingly, the server may set the same reference direction as the direction of the photographing device. Alternatively, the server may set the direction of data first received in order to generate VR content as the reference direction. Alternatively, the reference direction may have been previously input to the server.

At step S1950, the server may receive the data from the photographing device.

At step S1960, the server may identify whether the direction of the received data and the reference direction are different. The server may determine the direction of the received data using the direction information included in the data.

If the reference direction and the current direction are different, the server may apply the angle adaptive filter at step S1970.

That is, the server may change an angle by applying the angle adaptive filter to data having a direction different from the reference direction. Specifically, the server may calculate a difference between the reference direction and the direction of the data, and may change the data in an opposite direction by the calculated difference. For example, if the photographing direction has been rotated by θ, the photographing device may rotate data whose direction has been changed by −θ_using the angle adaptive filter.

The server may output the data at step S1980.

In contrast, if the reference direction and a current direction are not different or if direction information is not included in the data, the server may output the received data without applying the filter to the data. That is, the server may output the data and transmit the data to a VR UE.

If, as a result of the comparison, the direction of the received data and the reference direction are different, the server may change the direction of the received data and provide VR content in a consistent direction.

Although the reference direction and the direction of the received data are different, if a difference between the reference direction and the direction of the data is less than a threshold, the server may not apply the angle adaptive filter. That is, the server may correct the direction of the received data only when a difference between the reference direction and the direction of the data is the threshold or more. In this case, the threshold may be set as an angle at which a user does not feel inconvenient although the direction is changed. The threshold may have been previously determined or may be set by the setting of a VR content producer.

Figure 20:
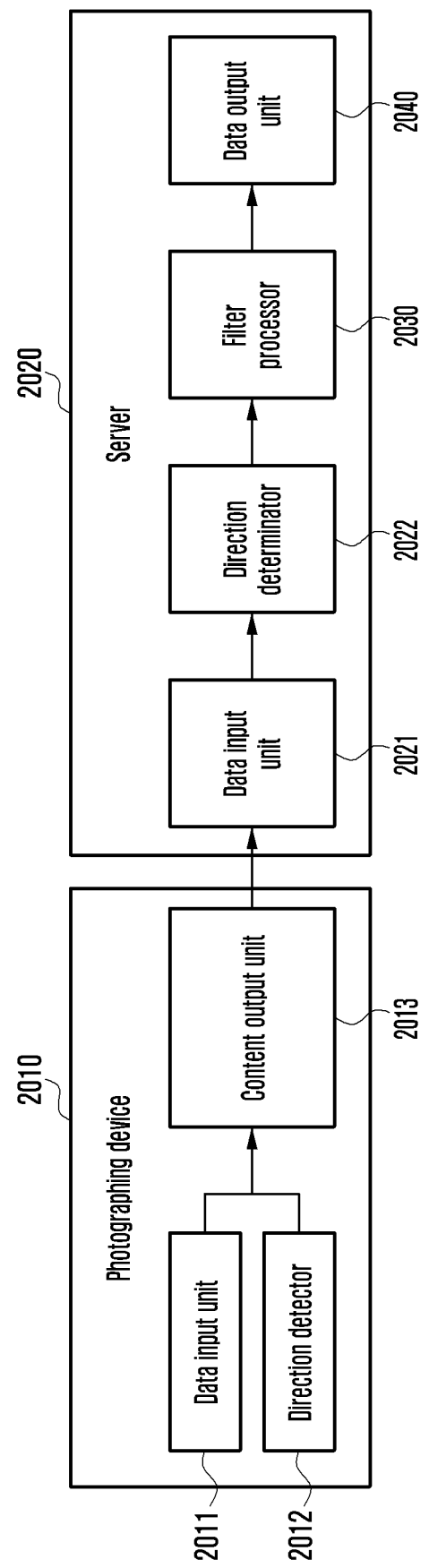
FIG. 20 is a diagram illustrating the configuration of the server and VR UE for providing VR content, according to an embodiment of the present disclosure.

FIG. 20 is a diagram illustrating the configuration of the server and VR UE for providing VR content, according to an embodiment of the present disclosure.

Referring to FIG. 20, the photographing device 2010 may include a data input unit 2011, a direction detector 2012, and a content output unit 2013. Furthermore, the server 2020 may include a data input unit 2021, a direction determinator 2022, a filter processor 2030 and a data output unit 2040.

The functions of the elements of the photographing device 2010 are similar to those illustrated in FIG. 18, and the description thereof are omitted. Content or data output by the content output unit 2013 may include direction information.

The data input unit 2021 of the server may receive data from the photographing device.

The direction determinator 2022 may determine the direction of the data using direction information included in the data. As described above, the direction information may include meta data. The direction information may include x coordinates, y coordinates, and z coordinates for each playback time and angle information. Alternatively, the direction information may include angle information for a reference direction.

The filter processor 2030 may perform the same function as the filter processor 1830. That is, if the direction of received data and the direction of the photographing device are different, the filter processor 2030 may calculate a difference between a reference direction and the direction of the received data and rotate the received data in an opposite direction by the calculated difference. The data output unit 2040 may output data. If a reference direction and the direction of data are different, the data output unit 2040 may output data to which the filter has been applied. If the reference direction and the direction of the data are not different, the data output unit 2040 may output the received data without any change.

The server may include a controller. The controller may control the data input unit 2021, the direction determinator 2022, the filter processor 2030, and the data output unit 2040 included in the server.

The controller may set a reference direction, and may provide the reference direction to the filter processor so that the filter processor determines whether or not to apply the filter. In this case, the filter processor may directly compare the reference direction and the direction of data and modify the direction of the data. Alternatively, the controller may directly determine whether the direction of data, determined by the direction determinator, and a reference direction are different, and may control the filter processor.

The server may further include a transceiver and a memory. The controller may control the transceiver and the memory.

The transceiver may perform communication with another device. The transceiver may receive or transmit data from or to the photographing device or the VR UE. The transceiver may transmit data, output by the data output unit 2040, to another device.

The memory may store output data. The memory may store a set reference direction and received data.

Figure 21:
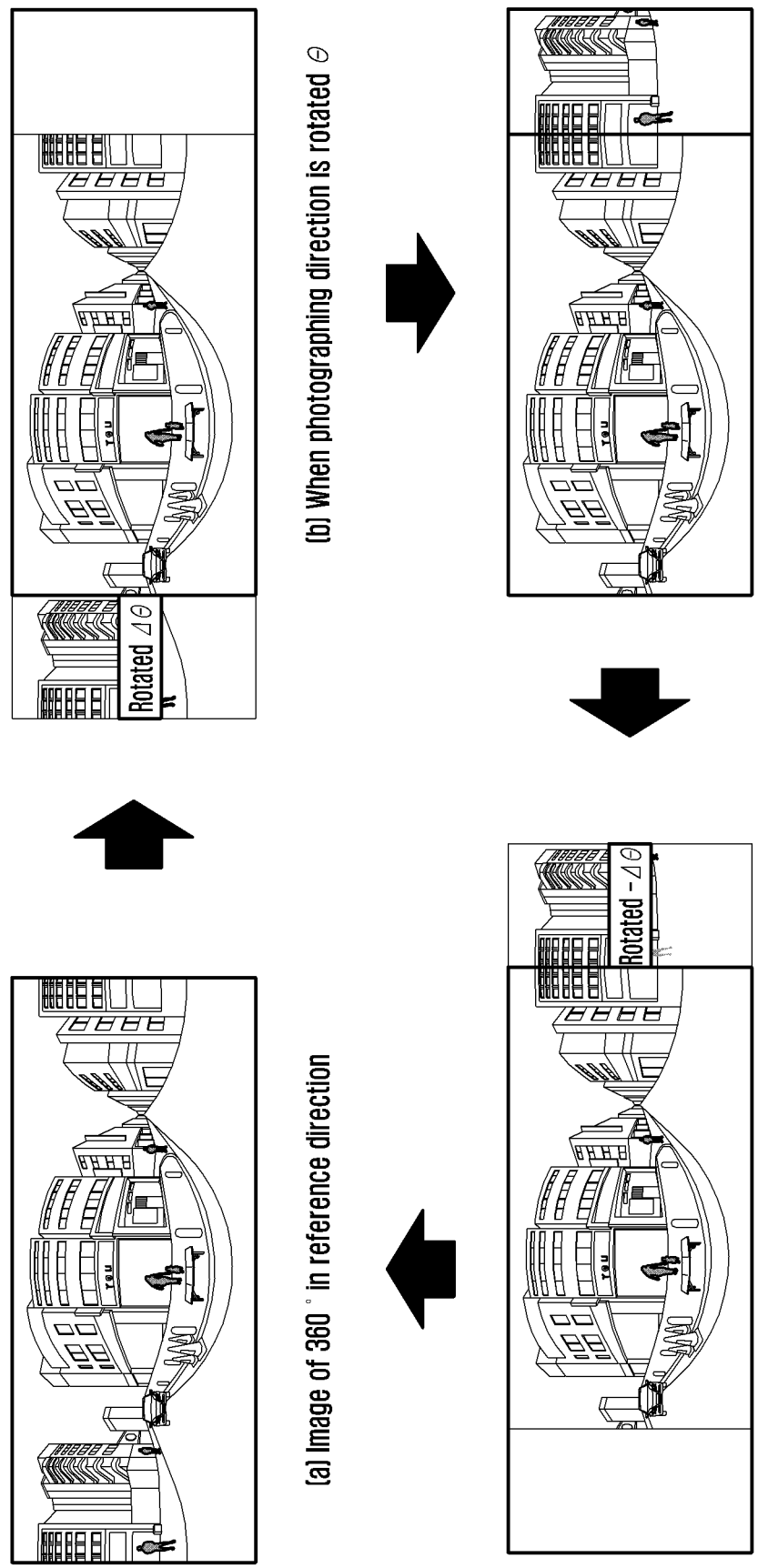
FIG. 21 is a diagram illustrating a method for providing VR content, according to an embodiment of the present disclosure.

FIG. 21 is a diagram illustrating a method for providing VR content, according to an embodiment of the present disclosure.

FIG. 21(*a*) illustrates an image captured by the photographing device in a reference direction.

FIG. 21(*b*) illustrates a case where the direction of the photographing device has been rotated at a specific angle (e.g., θ). FIG. 21(*c*) illustrates a change of an image according to a change of the photographing direction. When the angle of the camera is changed, an image being watched by a user may be changed.

FIG. 21(*d*) illustrates a method for providing an image having the same direction as the reference direction by applying the filter. That is, the image is reversely rotated at the same angle at which the photographing direction has been rotated, thereby being providing an effect in which content has been produced in the same direction.

According to an embodiment of the present disclosure, the server or the photographing device may correct the direction of an image by applying the filter.

Figure 22:
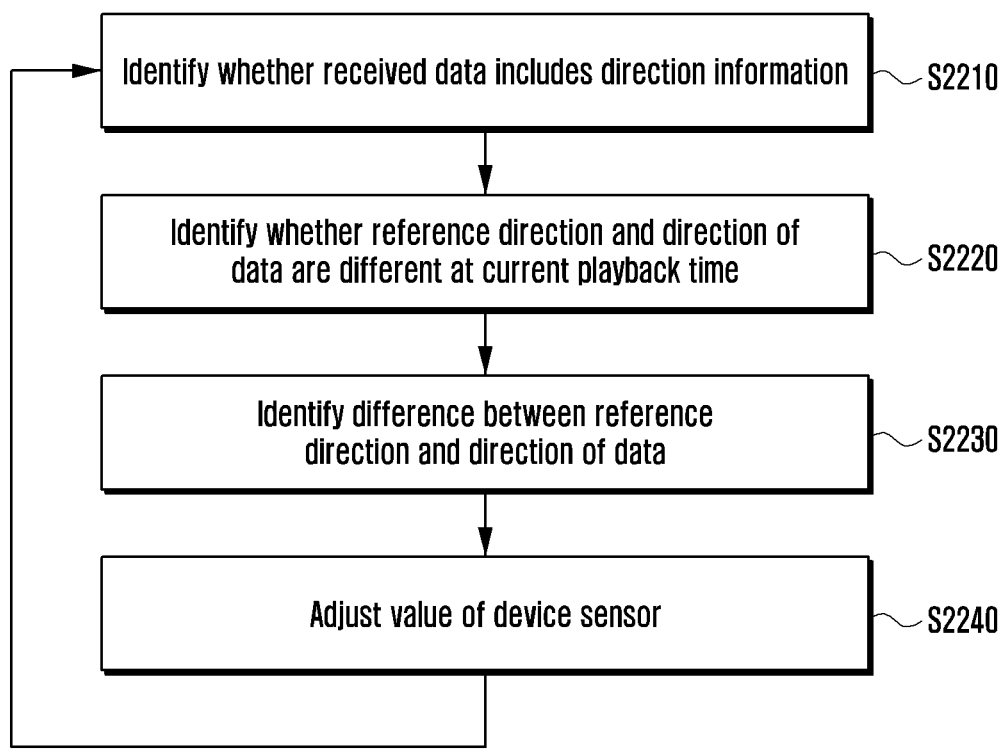
FIG. 22 is a flowchart illustrating a method for providing VR content, according to an embodiment of the present disclosure.

FIG. 22 is a flowchart illustrating a method for providing VR content, according to an embodiment of the present disclosure.

Referring to FIG. 22, the VR-related device may receive data. In this case, the data may be video data. The VR-related device may include a VR UE.

At step S2210, the UE may identify whether the received data includes direction information. The direction information may have been included in meta data. The VR-related device may identify whether direction meta data is present.

If the direction information is included, at step S2220, the UE may identify whether a reference direction and the direction of the data are different at a current playback time.

The reference direction may have been set in the UE or the reference direction may be included in the data and transmitted. Alternatively, the direction of the data first received in order to produce VR content may be set as the reference direction. The UE may identify the direction of the data based on the direction information included in the data. Accordingly, the UE may identify whether the reference direction and the direction of the data are different.

At operation 52230, the UE may identify a difference (e.g., direction change value) between the reference direction and the direction of the data. The UE may adjust the direction detection sensor of the UE based on the direction change value.

The UE may derive the direction change value by calculating a difference between the reference direction and the direction of the data. Alternatively, the data received by the UE may include the direction change value.

If the direction change value is included in the data, the UE may identify whether the reference direction and the direction of the data are different by identifying whether the direction change value is present in the data. The UE may adjust the device sensor based on the direction change value included in the data.

That is, the UE may adjust the value of the device sensor so that a user determines the data to be data generated in the same direction. Specifically, the UE may include the device sensor for recognizing the direction when a user turns the UE. When the user turns the UE to the left, the device sensor recognizes the direction of the UE, so the user can watch a left image. If the direction of the data is different from the reference direction, the device sensor of the UE may adjust the direction in an opposite direction based on the direction change value so that the direction can be recognized.

If the reference direction and the direction of the data are different, at step S2240, the UE may adjust the value of the device sensor of the UE. In this case, the device sensor may mean a direction detection sensor included in the UE.

For example, if a direction change value at a current playback time is +30°, the VR UE may adjust the device sensor as −30°.

According to an embodiment of the present disclosure, the UE may adjust the direction detection sensor of the UE if the direction change value is a threshold or more.

Figure 23:
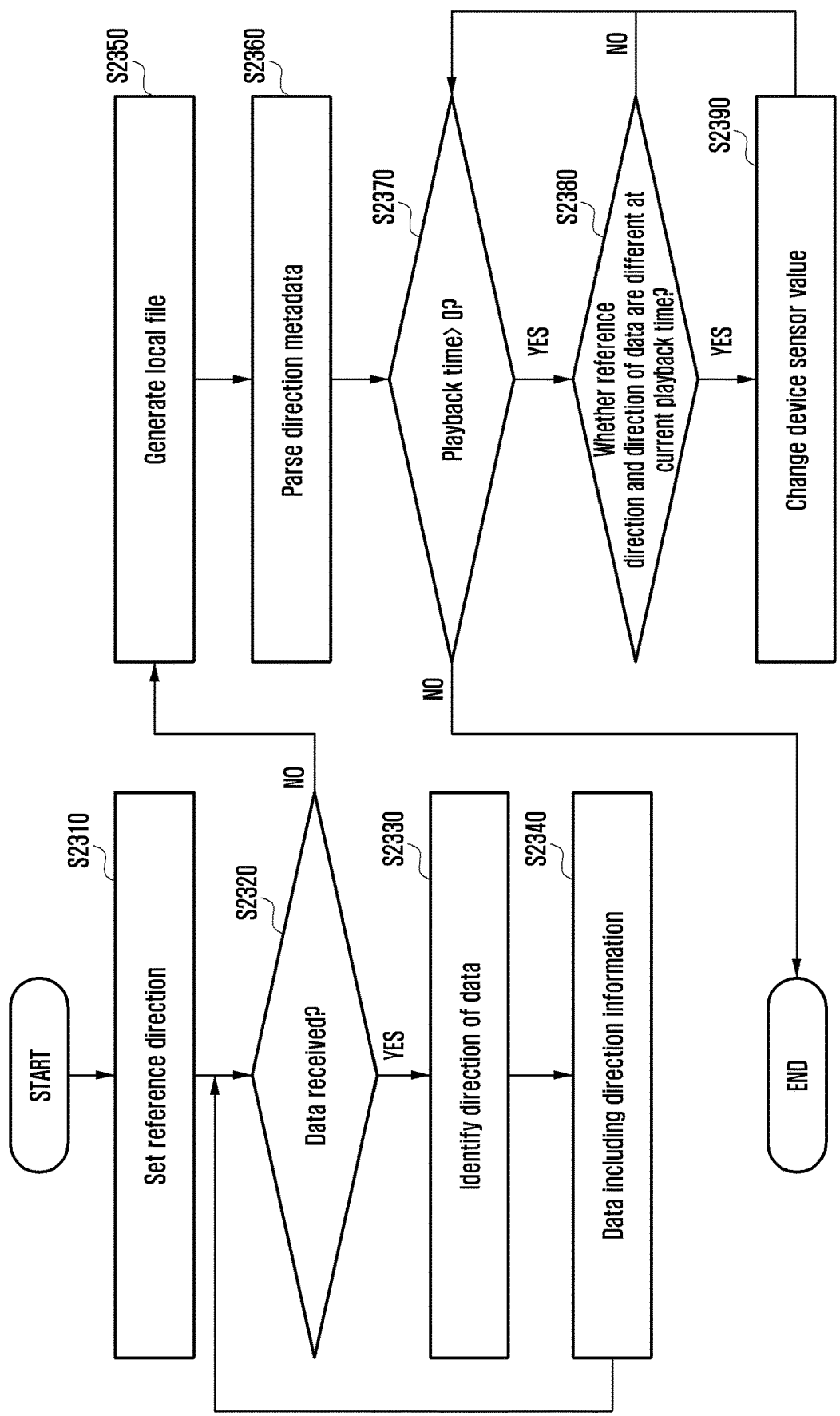
FIG. 23 is a flowchart illustrating a method for providing VR content according to an embodiment of the present disclosure.

FIG. 23 is a flowchart illustrating a method for providing VR content, according to an embodiment of the present disclosure.

Step S2310 to step S2350 are performed by the photographing device. That is, the photographing device may set a reference direction at step S2310, may determine whether data is received at step S2320, and may identify the direction of the received data when the data is received at step S2330. The photographing device may identify the direction of the received data in a photographing direction.

At step S2340, the photographing device may include direction information in the data. As described above the direction information may be included in meta data. The photographing device may input the meta data. In this case, the meta data including the direction information may be called direction meta data. The direction meta data may include the direction of the data for each playback time.

In this case, the direction information may include the x coordinates, y coordinates, and z coordinates of the photographing direction and angle information for x, y, and z. In this case, the operation of setting the reference direction may be omitted.

In contrast, the direction information may include information (e.g., direction change value) about an angle turned around the reference direction. In this case, the operation of setting the reference direction may be performed.

If data is no longer received, at step S2350, the photographing device may generate a local file. The local file may mean the aforementioned VR content.

The photographing device may directly transmit the local file to the UE.

The UE may set a reference direction. In this case, the reference direction set in the photographing device may be included in the data and transmitted. The VR UE may identify the reference direction of the photographing device. The VR UE may set the same reference direction as the photographing device. Alternatively, the reference direction may have been previously input to the VR UE.

At step S2360, the VR UE parses the direction meta data. The UE may identify the direction of the data using the parsed direction meta data. The meta data includes the direction of the data for each playback time. The UE may identify the direction of data generated according to the playback time.

Alternatively, the meta data may include information about a difference between the reference direction and the direction of the data for each playback time.

At step S2370, the UE may identify whether the playback time is greater than 0 That is, the UE may identify whether the playback time remains. If the playback time does not remain, the UE may terminate the procedure.

In contrast, if the playback time remains, at step S2380, the UE may identify whether the reference direction and the direction of the data are different based on the current playback time. The UE may directly determine whether the set reference direction and the direction of the received data are different. Alternatively, the UE may determine whether a direction change value is included in the direction meta data.

If the set reference direction and the direction of the received data are different, at step S2390, the UE may change the value of the device sensor. If direction information of the data is included in the direction meta data, the UE may calculate a direction change value using the reference direction and the direction of the data and adjust the device sensor using the direction change value. That is, the UE may change the device sensor value so that the device sensor recognizes an image in an opposite direction based on the direction change value.

If the direction change value is included in the direction meta data, the UE may adjust the device sensor using the direction change value. The description are the same as those described above and thus are omitted hereinafter.

The UE may perform step S2390 if the direction change value is greater than a threshold. That is, although the reference direction and the direction of the data are different, if the direction change value is smaller than the threshold, the UE may not adjust the device sensor. The UE may adjust the device sensor only when the direction change value is greater than the threshold.

Figure 24:
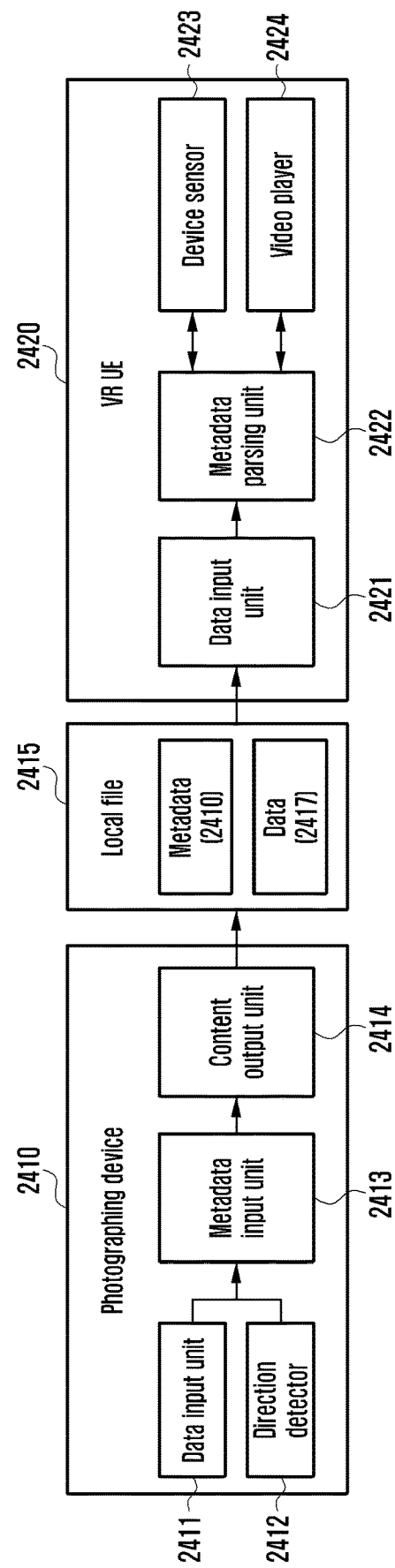
FIG. 24 is a diagram illustrating the configuration of a photographing device and VR UE for providing VR content, according to an embodiment of the present disclosure.

FIG. 24 is a diagram illustrating the configuration of a photographing device and VR UE for providing VR content, according to an embodiment of the present disclosure.

Referring to FIG. 24, the photographing device 2410 may include a data input unit 2411, a direction detector 2412, a meta data input unit 2413, and a content output unit 2414.

The data input unit 2411 may receive data. If the photographing device is a camera, the data input unit may mean a portion through which video is received through a camera lens.

The direction detector 2412 may detect the direction of the photographing device. The direction detector 2412 may detect the direction of the photographing device using a direction sensor included in the photographing device.

The meta data input unit 2413 may generate meta data including direction information and add the meta data to the data. The meta data input unit 2413 may input the direction of the data for each playback time.

The content output unit 2414 may output content. The content output unit 2414 may output content including direction meta data.

The photographing device may include a controller. The controller may control the data input unit 2411, the direction detector 2412, the meta data input unit 2413, and the content output unit 2414 included in the photographing device.

The controller may generate content using data including meta data and transmit the content to the UE through the content output unit. The controller may set or receive a reference direction.

The photographing device may further include a transceiver and a memory. The controller may control the transceiver and the memory.

The transceiver may perform communication with another device. The transceiver may provide generated content to the server or the VR UE. That is, the transceiver may transmit content, output by the content output unit, to another device. The transceiver may receive content generated by another device.

The memory may store generated content. The memory may store a set reference direction and input data and may store direction information.

Content output through the content output unit may be called a local file 2415. The local file may have a form in which meta data has been combined with data. The data may be video data.

The UE 2420 may include a data input unit 2421, a meta data parsing unit 2422, a device sensor 2423, and a video player 2424.

The data input unit 2421 may receive a local file transmitted by the photographing device.

The meta data parsing unit 2422 may parse meta data included in the local file. The meta data parsing unit 2422 may identify direction information of data included in the meta data. The meta data may include the direction of the data for each playback time. The meta data parsing unit 2422 may identify direction information of data for each playback time. Alternatively, the data may include a direction change value for each playback time. The meta data parsing unit 2422 may identify a direction change value for each playback time.

The device sensor 2423 means a direction detection sensor included in the UE so that a user can recognize a rotation direction when the user rotates the UE.

The video player 2424 may provide a user with content received from the photographing device.

The UE may include a controller. The controller may control the data input unit 2421, the meta data parsing unit 2422, the device sensor 2423, and the video player 2424 included in the UE.

The controller may identify or set a reference direction. The controller may identify whether the remaining playback time is greater than 0. The controller may identify the direction information of data at a current playback time through the meta data parsing unit 2422 and may compare the direction information with a reference direction. If the reference direction and the direction of the data are different, the controller may control the device sensor 2423. Alternatively, if a direction change value is included in meta data, the controller may control the device sensor 2423 based on a direction change value.

The controller may receive data, may identify the direction of the data, and may determine whether the direction of the data and a reference direction are different. If the direction of the data and the reference direction are different, the controller may adjust the direction detection sensor of the UE.

The UE may further include a transceiver and a memory. The controller may control the transceiver and the memory.

The transceiver may perform communication with another device. The transceiver may receive content from the server or the photographing device.

The memory may store received content. The memory may store a set reference direction and direction information.

Figure 25:
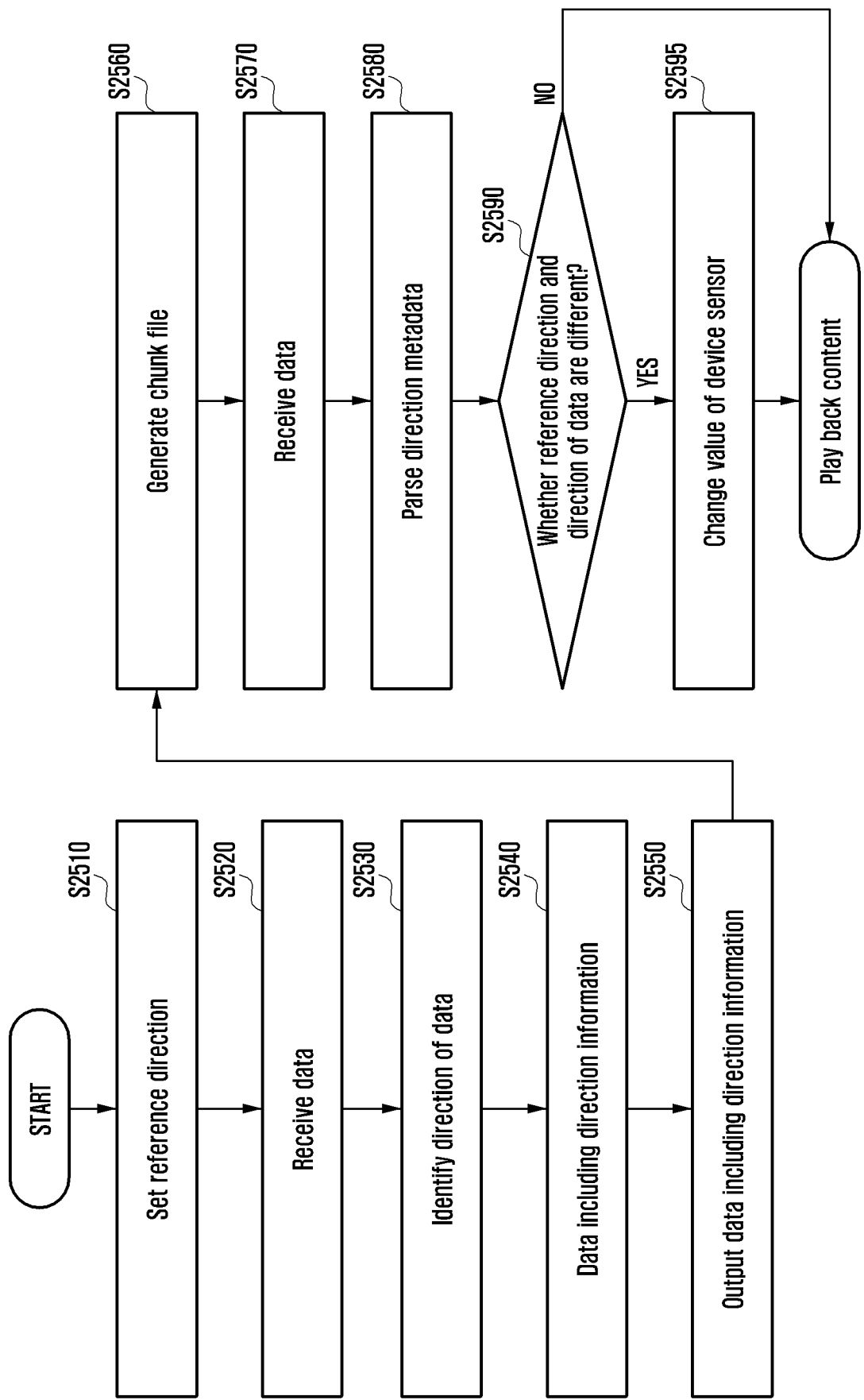
FIG. 25 is a flowchart illustrating an method for providing VR content, according to an embodiment of the present disclosure.

FIG. 25 is a flowchart illustrating an method for providing VR content, according to an embodiment of the present disclosure.

Referring to FIG. 25, the server generates a chunk file. The chunk file may mean data cut off for a specific interval for the purpose of streaming.

Step S2510 to step S2550 are performed by the photographing device. That is, the photographing device may set a reference direction at step S2510, may receive data at step S2520, and may identify the direction of the received data at step S2530. The photographing device may identify the direction of the received data in a photographing direction.

The photographing device may include direction information in data at step S2540. The direction information may be included in meta data. The photographing device may input the meta data. In this case, the meta data including the direction information may be called direction meta data. The direction meta data may include the direction of the data for each playback time.

The direction information may include the x coordinates, y coordinates, and z coordinates of a photographing direction and angle information for x, y, and z. In this case, the operation of the photographing device to set the reference direction may be omitted.

In contrast, the direction information may include information about an angle (e.g., direction change value) rotated around a reference direction. In this case, the operation of setting the reference direction may be performed.

At step S2550, the photographing device may output the data including direction information. That is, the photographing device may transmit the data, including the direction information, to the server.

At step S2560, the server that has received the data may generate a chunk file. Furthermore, the server may transmit the chunk file to the UE.

At step S2570, the UE may receive the data.

The UE may set a reference direction. In this case, the reference direction set in the photographing device may be included in the data and transmitted. The VR UE may identify the reference direction of the photographing device. Accordingly, the VR UE may set the same reference direction as the photographing device. Alternatively, the reference direction may have been previously input to the VR UE.

At step S2580, the UE may parse the direction meta data. The UE may identify the direction of the data using the parsed direction meta data.

The meta data includes the direction of the data for each playback time. The UE may identify the direction of generated data according to a playback time.

Alternatively, the meta data may include information about a difference between the reference direction and the direction of the data for each playback time.

At step S2590, the UE may identify whether the reference direction and the direction of the data are different. The UE may directly determine whether the set reference direction and the direction of the received data are different. Alternatively, the UE may identify whether a direction change value is included in the direction meta data.

If the set reference direction and the direction of the received data are different, at step S2595, the UE may change the value of the device sensor. If direction information of the data is included in the direction meta data, the UE may calculate a direction change value using the reference direction and the direction of the data, and may adjust the device sensor using the direction change value. That is, the UE may change the value of the device sensor so that the device sensor recognizes an image in an opposite direction by the direction change value.

If the direction change value is included in the direction meta data, the UE may adjust the device sensor using the direction change value. The description are the same as those described above and thus are omitted hereinafter.

Figure 26:
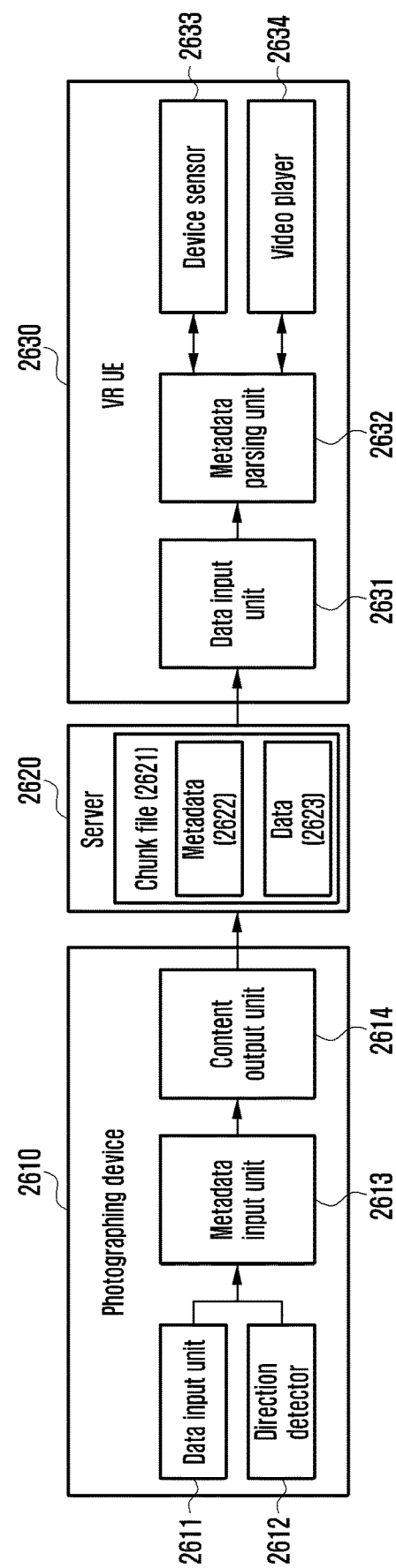
FIG. 26 is a diagram illustrating the configuration of the photographing device, server and VR UE for providing VR content, according to an embodiment of the present disclosure.

FIG. 26 is a diagram illustrating the configuration of the photographing device, server and VR UE for providing VR content, according to an embodiment of the present disclosure.

Referring to FIG. 26, the photographing device 2610 may include a data input unit 2611, a direction detector 2612, a meta data input unit 2613, and a content output unit 2614.

The data input unit 2611 may receive data. If the photographing device is a camera, the data input unit may mean a portion through which video is received through a camera lens.

The direction detector 2612 may detect the direction of the photographing device. The direction detector 2612 may detect the direction of the photographing device using the direction sensor of the photographing device.

The meta data input unit 2613 may generate meta data including direction information and add the meta data to the data. The meta data input unit 2613 may input the direction of the data for each playback time.

The content output unit 2614 may output content. The content output unit 2614 may output data or content including direction meta data.

The photographing device may include a controller. The controller may control the data input unit 2611, the direction detector 2412, the meta data input unit 2613, and the content output unit 2614 included in the photographing device.

The controller may transmit data to which meta data has been input to the UE through the content output unit. The controller may set or receive a reference direction.

The photographing device may further include a transceiver and a memory. The controller may control the transceiver and the memory.

The transceiver may perform communication with another device. The transceiver may provide data to the server or the VR UE. That is, the transceiver may transmit data, output by the content output unit, to another device. The transceiver may receive data generated by another device.

The memory may store a set reference direction and input data, and may store direction information.

The photographing device 2610 may output data and transmit the data to the server 2620. The server may generate a chunk file.

The chunk file may have a form in which meta data has been combined with data, and may mean that a data file is cut off for a specific interval for streaming purposes. The data may be video data.

The UE 2630 may include a data input unit 2631, a meta data parsing unit 2632, a device sensor 2633, and a video player 2634.

The data input unit 2631 may receive a chunk file transmitted by the server.

The meta data parsing unit 2632 may parse meta data included in a chunk file. The meta data parsing unit 2632 may identify direction information of data included in the meta data. The meta data may have included the direction of the data for each playback time. The meta data parsing unit 2632 may identify the direction information of the data for each playback time. Alternatively, the data may have included a direction change value for each playback time. The meta data parsing unit 2632 may identify the direction change value for each playback time.

The device sensor 2633 means a sensor included in the UE so that a user can recognize a rotation direction when the UE is rotated.

The video player 2634 may provide a user with content received from the photographing device.

The UE may include a controller. The controller may control the data input unit 2631, the meta data parsing unit 2632, the device sensor 2633, and the video player 2634 included in the UE.

The controller may identify or set a reference direction. The controller may identify whether the remaining playback time is greater than 0. The controller may identify direction information of data at a current playback time through the meta data parsing unit 2632, and may compare the direction information with the reference direction. If the reference direction and the direction of the data are different, the controller may control the device sensor 2633 using the results of the comparison. Alternatively, if the meta data includes a direction change value, the controller may control the device sensor 2423 based on the direction change value, and detailed contents are the same as those described above.

The controller may receive data, may identify the direction of the data, and may determine whether the direction of the data and the reference direction are different. If the direction of the data and the reference direction are different, the UE may adjust the direction detection sensor.

The UE may further include a transceiver and a memory. The controller may control the transceiver and the memory.

The transceiver may perform communication with another device. The transceiver may receive content from the server or the photographing device.

The memory may store received content. The memory may store a set reference direction and direction information.

According to an embodiment of the present disclosure, the best RAT can be determined by taking into consideration a dynamically changed parameter.

According to an embodiment of the present disclosure, a lost packet can be recovered without a reduction of throughput.

According to an embodiment of the present disclosure, the confusion of a user can be prevented and realistic service can be provided by providing VR content in the same direction regardless of a photographing direction.

While the present disclosure has been shown and described with reference to various embodiments thereof, it will be understood by those skilled in the art that various changes in form and details may be made therein without departing from the scope of the disclosure as defined by the appended claims and their equivalents.

What is claimed is:

1. A method performed by a terminal in a wireless communication system, the method comprising:
   obtaining at least one first parameter of a plurality of parameters used for determining a radio access technology (RAT), the at least one first parameter being selected by a user of the terminal;
   identifying a weight value for each of the plurality of parameters, a weight value for the at least one first parameter being set to higher than a weight value for at least one second parameter of the plurality of parameters;
   determining a quality value for each of a plurality of RATs, the quality value being determined for each of the plurality of parameters;
   determining a first RAT from the plurality of RATs based on the weight value and the quality value for each of the plurality of RATs;
   transmitting data based on the first RAT; and
   updating, based on a result of a transmission of the data, a quality value for the first RAT,
   wherein the weight value for each of the plurality of parameters is changed based on traffic characteristic information and state information of the terminal.

2. The method of claim 1, wherein determining the first RAT comprises:
   determining the first RAT from the plurality of RATs based on a product of the weight value and the quality value for each of the plurality of RATs.

3. The method of claim 1, wherein the RAT includes at least one of WiFi access network, 3G access network, 4G access network, or 5G access network.

4. The method of claim 1, wherein determining the quality value further comprises:
   identifying whether a second RAT, which is not included in the plurality of RATs, is available; and
   determining a quality value for the second RAT in case that the second RAT is available.

5. The method of claim 4, wherein the quality value for the second RAT is determined based on at least one of history information or information on an initial quality value for the second RAT.

6. The method of claim 1, wherein the quality value for each of the plurality of RATs is determined as a relative value for the plurality of RATs.

7. The method of claim 1, wherein the quality value for each of the plurality of RATs is determined based on subscription information of the terminal.

8. The method of claim 1, wherein the plurality of parameters include at least one of a cost, current consumption, speed, and connection stability.

9. A terminal in a wireless communication system, the terminal comprising:
   a transceiver; and
   a controller coupled with the transceiver and configured to:
   obtain at least one first parameter of a plurality of parameters, used for determining a radio access technology (RAT), the at least one first parameter being selected by a user of the terminal,
   identify a weight value for each of the plurality of parameters, a weight value for the at least one first parameter being set to higher than a weight value for at least one second parameter of the plurality of parameters,
   determine a quality value for each of a plurality of RATs, the quality value being determined for each of the plurality of parameters,
   determine a first RAT from the plurality of RATs based on the weight value and the quality value for each of the plurality of RATs,
   transmit data based on the first RAT, and
   update, based on a result of a transmission of the data, a quality value for the first RAT,
   wherein the weight value for each of the plurality of parameters is changed based on traffic characteristic information and state information of the terminal.

10. The terminal of claim 9, wherein the controller is configured to:
    determine the first RAT based on a product of the weight value and the quality value for each of the plurality of RATs.

11. The terminal of claim 9, wherein the RAT includes at least one of WiFi access network, 3G access network, 4G access network, or 5G access network.

12. The terminal of claim 9, wherein the controller is further configured to:
    identify whether a second RAT, which is not included in the plurality of RATs, is available, and
    determine a quality value for the second RAT in case that the second RAT is available.

13. The terminal of claim 12, wherein the quality value for the second RAT is determined based on at least one of history information or information on an initial quality value for the second RAT.

14. The terminal of claim 9, wherein the quality value for each of the plurality of RATs is determined as a relative value for the plurality of RATs.

15. The terminal of claim 9, wherein the quality value for each of the plurality of RATs is determined based on subscription information of the terminal.

16. The terminal of claim 9, wherein the plurality of parameters include at least one of a cost, current consumption, speed, and connection stability.

* * * * *